US012273031B2

United States Patent
Cheng et al.

(10) Patent No.: US 12,273,031 B2
(45) Date of Patent: Apr. 8, 2025

(54) CONSTANT TIME BUCK-BOOST SWITCHING CONVERTER AND MODULATION CONTROL CIRCUIT AND CONTROL METHOD THEREOF

(71) Applicant: Richtek Technology Corporation, Zhubei (TW)

(72) Inventors: Hung-Yu Cheng, Taipei (TW); Tsung-Han Yu, Hsinchu (TW); Keng-Hong Chu, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 348 days.

(21) Appl. No.: 17/858,149

(22) Filed: Jul. 6, 2022

(65) Prior Publication Data

US 2023/0198404 A1    Jun. 22, 2023

Related U.S. Application Data

(60) Provisional application No. 63/292,131, filed on Dec. 21, 2021.

(30) Foreign Application Priority Data

Jan. 28, 2022    (TW) .................................. 111104184

(51) Int. Cl.
 *H02M 3/158*    (2006.01)
 *H02M 1/00*    (2006.01)
(52) U.S. Cl.
 CPC ....... *H02M 3/1582* (2013.01); *H02M 1/0003* (2021.05)

(58) Field of Classification Search
 CPC ............ H02M 3/00; H02M 3/02; H02M 3/04; H02M 3/10; H02M 3/145; H02M 3/155; H02M 3/156; H02M 3/1563; H02M 3/1566; H02M 3/157; H02M 3/158; H02M 3/1582; H02M 3/1588; H02M 1/00; H02M 1/0003; H02M 1/0016; H02M 1/0019; H02M 1/0022; H02M 1/0025; H02M 1/08; H02M 1/088; Y02B 70/10

(Continued)

(56) References Cited

U.S. PATENT DOCUMENTS 6,166,527 A    12/2000 Dwelley et al.
7,176,667 B2    2/2007 Chen et al.
(Continued)

*Primary Examiner* — Thienvu V Tran
*Assistant Examiner* — Carlos O Rivera-Perez
(74) *Attorney, Agent, or Firm* — Tung & Associates

(57) ABSTRACT

A constant time buck-boost switching converter includes: a power switch circuit for switching a first terminal of an inductor between an input voltage and a ground, and for switching a second terminal of the inductor between an output voltage and the ground; and a modulation control circuit for generating a buck ramp signal and a boost ramp signal and for controlling the inductor according to comparisons of these two ramp signals with an error amplification signal, so as to convert the input voltage to the output voltage. The average levels of the buck ramp signal and the boost ramp signal are both equal to a product of the output voltage multiplied by a predetermined ratio. The upper limit of the buck ramp signal and the lower limit of the boost ramp signal are both equal to a product of the input voltage multiplied by the predetermined ratio.

21 Claims, 16 Drawing Sheets

(58) Field of Classification Search
USPC ................ 323/222–226, 259, 271–275, 280, 323/282–286, 288, 299–303, 351
See application file for complete search history.

(56) References Cited

U.S. PATENT DOCUMENTS

| | | |
|---|---|---|
| 9,787,187 B2 | 10/2017 | Cheng |
| 2011/0156685 A1 | 6/2011 | Chen et al. |
| 2012/0146594 A1* | 6/2012 | Kobayashi .......... H02M 3/1582 |
| | | 323/234 |
| 2017/0346400 A1* | 11/2017 | Li ....................... H02M 3/1582 |

* cited by examiner

CONSTANT TIME BUCK-BOOST SWITCHING CONVERTER AND MODULATION CONTROL CIRCUIT AND CONTROL METHOD THEREOF

CROSS REFERENCE

The present invention claims priority to U.S. 63/292,131 filed on Dec. 21, 2021 and claims priority to TW 111104184 filed on Jan. 28, 2022.

BACKGROUND OF THE INVENTION

Field of Invention

The present invention relates to a buck-boost switching converter; particularly, it relates to a constant time buck-boost switching converter. The present invention also relates to a modulation control circuit and a control method for controlling such buck-boost switching converter.

Description of Related Art

Please refer to FIG. 1A, which shows a schematic diagram of a conventional buck-boost switching converter disclosed in U.S. Pat. No. 6,166,527. The conventional buck-boost switching converter comprises: an inductor L, four power switches A, B, C and D and a control circuit 120. The control circuit 120 controls the four power switches A, B, C and D, so as to convert an input voltage Vin to an output voltage Vout. The input voltage Vin may be higher than or lower than the output voltage Vout, so the power supply circuit may need to execute a buck conversion or a boost conversion. In the control circuit 120, an error amplifier 22 compares a feedback signal FB (which indicates information of the output voltage Vout) with a reference voltage Vref, to generate an error amplification signal Vea. A pulse width modulation (PWM) comparator 24 compares the error amplification signal Vea with a voltage waveform VX, whereas, a PWM comparator 25 compares the error amplification signal Vea with a voltage waveform VY. A logic circuit generates control signals VA, VB, VC and VD according to the comparison results of the PWM comparator 24 and the PWM comparator 25, so as to control the power switches A, B, C and D by the control signals VA, VB, VC and VD, respectively.

FIG. 1B shows the relationships among the error amplification signal Vea, the voltage waveforms VX and VY, the control signals VA, VB, VC and VD. When the error amplification signal Vea is between a voltage V1 and a voltage V2, the power supply circuit executes a buck conversion. When the error amplification signal Vea is between a voltage V2 and a voltage V3, the power supply circuit executes a buck-boost conversion. When the error amplification signal Vea is between a voltage V3 and a voltage V4, the power supply circuit executes a boost conversion. In the buck mode, the power switch C is always kept OFF, whereas, the power switch D is always kept ON. In the boost mode, the power switch A is always kept ON, whereas, the power switch B is always kept OFF. In the buck-boost mode, as shown in FIG. 1B, the control signals VA and VB are generated based upon the relationship between the error amplification signal Vea and the voltage waveform VX, whereas, the control signals VC and VD are generated based upon the relationship between the error amplification signal Vea and the voltage waveform VY. That is, the power supply circuit executes a mixed operation of boost conversion (wherein the power switch C and the power switch D are operated) and buck conversion (wherein the power switch A and the power switch B are operated).

The prior art shown in FIG. 1A and FIG. 1B has the following drawbacks: first, the prior art shown in FIG. 1A and FIG. 1B has a buck conversion mode, a buck-boost conversion mode and a boost conversion mode, and it is required for this prior art to include a buck-boost conversion region, that is, it is required for the voltage V2 to be smaller than the voltage V3, or otherwise the system will become unstable. Second, in the buck-boost conversion mode, the four power switches A, B, C and D are all in operation, which will result in a higher switching loss and a higher power consumption. These are the major drawbacks of the prior art shown in FIG. 1A and FIG. 1B.

Please refer to FIG. 2A, which shows a schematic diagram of a conventional buck-boost switching converter disclosed in U.S. Pat. No. 7,176,667. This prior art generates two error amplification signals Vea1 and Vea2 by an error amplifier 22. One of the two error amplification signals Vea1 and Vea2 is selected to be inputted to a PWM comparator 24, and the PWM comparator 24 compares the selected error amplification signal (Vea1 or Vea2) with a voltage waveform OSC. Besides, this prior art further includes a constant pulse width generation circuit. According to the output of the PWM comparator 24 and the output of the constant pulse width generation circuit, a logic circuit generates control signals VA, VB, VC and VD for controlling power switches A, B, C and D, respectively.

Please refer to FIG. 2B. The conventional buck-boost switching converter disclosed in U.S. Pat. No. 7,176,667 has four conversion modes. In addition to a pure buck mode M1 and a pure boost mode M4, an interfacial buck mode M2 and an interfacial boost mode M3 are included between the pure buck mode M1 and the pure boost mode M4. In the interfacial buck mode M2, the control signals VA and VB operate according to the output of the PWM comparator 24, whereas, the control signals VC and VD have a constant pulse width. In the interfacial boost mode M3, the control signals VC and VD operate according to the output of the PWM comparator 24, whereas, the control signals VA and VB have a constant pulse width.

The prior art shown in FIG. 2A and FIG. 2B has the drawback that four conversion modes require a more complicated control mechanism. First, it is required for the prior art to additionally include the constant pulse width generation circuit and other circuit devices; second, the presence of the two interfacial conversion modes (i.e., M2 and M3) indicates that there is a higher likelihood for the circuit to operate in these two regions. In the two interfacial conversion modes, all four power switches A, B, C and D need to be in operation, which will result in higher switching loss and higher power consumption.

Moreover, the prior art shown in FIG. 1A and FIG. 1B as disclosed in U.S. Pat. No. 6,166,527 and the prior art shown in FIG. 2A and FIG. 2B as disclosed in U.S. Pat. No. 7,176,667 both operate by constant frequency. Because constant frequency often limits the loop bandwidth, both prior arts have a slower response to load variation. Furthermore, under pulse frequency modulation (PFM) mechanism, it is required for these two prior arts to employ complicated circuit remedy design to cope with situations such as, when the load current is extremely small, or, when PFM is unable to be fulfilled, for example when the input voltage Vin and the output voltage Vout are very close to each other.

Please refer to FIG. 3A, which shows a schematic diagram of a conventional buck-boost switching converter disclosed in U.S. Publication Patent No. US 2011/0156685 A1. This conventional buck-boost switching converter comprises: an inductor L, four power switches A, B, C and D and a control circuit, which are configured to convert an input voltage Vin to an output voltage Vout. The control circuit controls the four power switches A, B, C and D, so as to convert the input voltage Vin to the output voltage Vout. In the control circuit, an error amplifier compares a feedback signal FB (which indicates information of the output voltage Vout) with a reference voltage Vref, to generate an error amplification signal, and the error amplification signal is inputted to a PWM comparator. Besides, the circuit obtains a signal related to an inductor current and inputs it to the PWM comparator, so that the PWM comparator compares the signal related to an inductor current with the error amplification signal. An output of the PWM comparator is transmitted to an ON time generation circuit, so as to generate an ON time of corresponding power switches A, B, C and D. A driver circuit generates switch driving signals VA, VB, VC and VD for controlling the power switches A, B, C and D, respectively. This prior art has a feature that this prior art is simply required to employ one PWM comparator because only one set of ON time needs to be generated. Although this prior art can implement a buck-boost switching converter by very simple hardware configuration, this prior art has the following drawback that, regardless whether the input voltage Vin is greater than, smaller than or equal to the output voltage Vout, the circuit always operates in a buck-boost conversion mode, wherein it is required to switch the four power switches A, B, C and D during each cycle period. As shown in FIG. 3B and FIG. 3C, in each cycle period, the power switches A and C are first ON (as indicated by a current direction illustrated with a solid line), and next the power switches B and D are ON (as indicated by a current direction illustrated with a dashed line). Such operation is repeated in every cycle period, resulting in a relatively higher switching loss.

Please refer to FIG. 4, which shows a schematic diagram of a conventional buck-boost switching converter disclosed in U.S. Pat. No. 9,787,187. The conventional buck-boost switching converter 50 generates two sets of constant times via two sets of comparison circuits and an ON time generator and an OFF time generator, so that the conventional buck-boost switching converter 50 can operate in either a pure boost mode or a pure buck mode, wherein an ON time of the power switch A and an ON time of the power switch D can be extended without any restriction.

The prior art shown in FIG. 4 has the following drawback that: because the ON time of the power switch A and the ON time of the power switch D can be extended without any restriction, the operation frequency of the power switches A and D has a relatively higher variation, which will result in unwanted noise interference. Besides, the output voltage has a relatively greater ripple.

As compared to the aforementioned prior arts, the present invention is advantageous in that: first, the buck-boost switching converter of the present invention has a fast load transient response. Second, it is not necessary for the present invention to execute slope compensation. Third, the present invention can be applied to PFM operation without requiring complicated hardware and complicated circuit control mechanism. Fourth, the buck-boost switching converter of the present invention can operate only in a pure buck conversion mode and a pure boost conversion mode without the presence of a buck-boost conversion mode or any interfacial conversion mode. Fifth, the ON time of the present invention will not be extended unlimitedly, so the operation frequency of the power switches of the present invention has a relatively smaller variation, which will less likely cause noise interference. Sixth, the output voltage of the power switches of the present invention has a relatively smaller ripple. Last, in the present invention, the transition speed between the conversion modes and the response speed are relatively faster.

SUMMARY OF THE INVENTION

From one perspective, the present invention provides a constant time buck-boost switching converter, which is configured to operably convert an input voltage to an output voltage; the constant time buck-boost switching converter comprising: a power switch circuit including: a buck switch unit and a boost switch unit, wherein the buck switch unit is configured to operably switch a first terminal of an inductor between an input voltage and a ground, and wherein the boost switch unit is configured to operably switch a second terminal of the inductor between an output voltage and the ground; and a modulation control circuit, which is configured to operably generate a buck ramp signal and a boost ramp signal according to the input voltage and the output voltage and which is configured to operably control the buck switch unit and the boost switch unit according to a comparison between a feedback related signal related to the output voltage and the buck ramp signal and a comparison between the feedback related signal and the boost ramp signal, so as to convert the input voltage to the output voltage; wherein an average voltage level of the buck ramp signal is equal to a product of the output voltage multiplied by a predetermined ratio, wherein an upper limit of a voltage level of the buck ramp signal is equal to a product of the input voltage multiplied by the predetermined ratio, wherein an average voltage level of the boost ramp signal is equal to a product of the output voltage multiplied by the predetermined ratio, wherein a lower limit of a voltage level of the boost ramp signal is equal to a product of the input voltage multiplied by the predetermined ratio, and wherein the voltage level of the boost ramp signal is higher than the voltage level of the buck ramp signal.

In one embodiment, in a case when the feedback related signal does not exceed the buck ramp signal and also does not exceed the boost ramp signal, the modulation control circuit controls the power switch circuit to operate in a constant ON time buck conversion mode according to a first constant ON time; in a case when the feedback related signal exceeds the buck ramp signal and also exceeds the boost ramp signal, the modulation control circuit controls the power switch circuit to operate in a constant ON time boost conversion mode according to a second constant ON time.

In one embodiment, when the feedback related signal exceeds the buck ramp signal, the modulation control circuit controls the power switch circuit to enter to a first state and the power switch circuit maintains in the first state for the first constant ON time, and thereafter, when the feedback related signal does not exceed the buck ramp signal, the modulation control circuit controls the power switch circuit to enter to a second state and the power switch circuit maintains in the second state until the feedback related signal once again exceeds the buck ramp signal; or when the feedback related signal exceeds the boost ramp signal, the modulation control circuit controls the power switch circuit to enter to a third state and the power switch circuit maintains in the third state for the second constant ON time, and thereafter, the modulation control circuit controls the power switch circuit to enter to the first state and the power switch circuit maintains in the first state until the feedback related signal once again exceeds the boost ramp signal or until the feedback related signal does not exceed the buck ramp signal; wherein in the first state, the first terminal of the inductor is electrically connected to the input voltage, and the second terminal of the inductor is electrically connected to the output voltage; wherein in the second state, the first terminal of the inductor is electrically connected to the ground, and the second terminal of the inductor is electrically connected to the output voltage; wherein in the third state, the first terminal of the inductor is electrically connected to the input voltage, and the second terminal of the inductor is electrically connected to the ground.

In one embodiment, after the power switch circuit enters to the first state and the power switch circuit maintains in the first state for the first constant ON time, when the feedback related signal exceeds the buck ramp signal, the power switch circuit maintains in the first state until the feedback related signal does not exceed the buck ramp signal or until the feedback related signal exceeds the boost ramp signal.

In one embodiment, when the power switch circuit maintains in the first state until the feedback related signal does not exceed the buck ramp signal, the modulation control circuit controls the power switch circuit to enter to the second state and the power switch circuit maintains in the second state for a minimum OFF time.

In one embodiment, when the first constant ON time ends, and when the feedback related signal exceeds the buck ramp signal such that the power switch circuit is required to maintain in the first state, a switching frequency of the power switch circuit is decreased as the power switch circuit maintains in the first state, wherein a lower limit of the switching frequency is correlated with at least one of the following parameters: a slope of the buck ramp signal, a peak-to-peak value of the buck ramp signal, a slope of the boost ramp signal and/or a peak-to-peak value of the boost ramp signal.

In one embodiment, the feedback related signal is compared with a difference of the buck ramp signal minus an offset, or wherein the feedback related signal is compared with a sum of the boost ramp signal plus the offset.

In one embodiment, when the first constant ON time ends, and when the feedback related signal exceeds the buck ramp signal such that the power switch circuit is required to maintain in the first state, a switching frequency of the power switch circuit is decreased as the power switch circuit maintains in the first state, wherein a lower limit of the switching frequency is correlated with the offset corresponding to the buck ramp signal or the offset corresponding to the boost ramp signal.

In one embodiment, the offset corresponding to the buck ramp signal is smaller than the peak-to-peak value of the buck ramp signal, or wherein the offset corresponding to the boost ramp signal is smaller than the peak-to-peak value of the boost ramp signal.

In one embodiment, the modulation control circuit includes: a buck switch emulation circuit, which is configured to operably switch an emulation buck switching node between the input voltage and the ground synchronously when the buck switch unit switches the first terminal of the inductor between the input voltage and the ground; a buck voltage-divider circuit, which is configured to operably divide a voltage at the emulation buck switching node according to a predetermined ratio, so as to generate a buck divided voltage; a buck integration circuit including a buck integration capacitor, which is configured to be operably charged or discharged according to the buck divided voltage which varies according to a switching of the buck switch emulation circuit, so as to generate the buck ramp signal; a boost switch emulation circuit, which is configured to operably switch an emulation boost switching node between the output voltage and the ground synchronously when the boost switch unit switches the second terminal of the inductor between the output voltage and the ground; a boost voltage-divider circuit coupled between the input voltage and the emulation boost switching node, wherein the boost voltage-divider circuit is configured to operably divide a voltage difference between a voltage at the emulation boost switching node and the input voltage according to the predetermined ratio, so as to generate a boost divided voltage; and a boost integration circuit including a boost integration capacitor, which is configured to be operably charged or discharged according to the boost divided voltage which varies according to a switching of the boost switch emulation circuit, so as to generate the boost ramp signal.

In one embodiment, the buck switch emulation circuit includes an emulation buck upper gate switch and an emulation buck lower gate switch which are connected in series between the input voltage and the ground, wherein the emulation buck upper gate switch and the emulation buck lower gate switch are coupled to each other at the emulation buck switching node, so that the emulation buck upper gate switch and the emulation buck lower gate switch are configured to operably switch the emulation buck switching node according to a switching of the first terminal of the inductor; the buck integration circuit further includes: a buck integration resistor, which is coupled in series to the buck integration capacitor and is coupled to the emulation buck switching node, wherein the buck integration resistor is configured to operably determine a charging/discharging current of the buck integration capacitor, so as to generate the buck ramp signal; the boost switch emulation circuit includes an emulation boost upper gate switch and an emulation boost lower gate switch which are connected in series between the output voltage and the ground, wherein the emulation boost upper gate switch and the emulation boost lower gate switch are coupled to each other at the emulation boost switching node, so that the emulation boost upper gate switch and the emulation boost lower gate switch are configured to operably switch the emulation boost switching node according to a switching of the second terminal of the inductor; and the boost integration circuit further includes: a boost integration resistor, which is coupled in series to the boost integration capacitor and is coupled to the emulation boost switching node, wherein the boost integration resistor is configured to operably determine a charging/discharging current of the boost integration capacitor, so as to generate the boost ramp signal.

From another perspective, the present invention provides a control method, which is configured to operably control a constant time buck-boost switching converter; the control method comprising: switching a first terminal of an inductor between an input voltage and a ground and switching a second terminal of the inductor between an output voltage and the ground, so as to convert the input voltage to the output voltage; generating a buck ramp signal and a boost ramp signal according to the input voltage and the output voltage; and controlling the switching operations of the first terminal and the second terminal of the inductor according to a comparison result between a feedback related signal related to the output voltage and a comparison result between the feedback related signal and the boost ramp signal, so as to convert the input voltage to the output voltage; wherein an average voltage level of the buck ramp signal is equal to a product of the output voltage multiplied by a predetermined ratio, wherein an upper limit of a voltage level of the buck ramp signal is equal to a product of the input voltage multiplied by the predetermined ratio, wherein an average voltage level of the boost ramp signal is equal to a product of the output voltage multiplied by the predetermined ratio, wherein a lower limit of a voltage level of the boost ramp signal is equal to a product of the input voltage multiplied by the predetermined ratio, wherein the voltage level of the boost ramp signal is higher than the voltage level of the buck ramp signal.

In one embodiment, the step of controlling the switching operations of the first terminal and the second terminal of the inductor includes: in a case when the feedback related signal does not exceed the buck ramp signal and also does not exceed the boost ramp signal, the modulation control circuit controls the power switch circuit to operate in a constant ON time buck conversion mode according to a first constant ON time; or in a case when the feedback related signal exceeds the buck ramp signal and also exceeds the boost ramp signal, the modulation control circuit controls the power switch circuit to operate in a constant ON time boost conversion mode according to a second constant ON time.

In one embodiment, when the feedback related signal exceeds the buck ramp signal, the modulation control circuit controls the power switch circuit to enter to a first state and the power switch circuit maintains in the first state for the first constant ON time, and thereafter, when the feedback related signal does not exceed the buck ramp signal, the modulation control circuit controls the power switch circuit to enter to a second state and the power switch circuit maintains in the second state until the feedback related signal once again exceeds the buck ramp signal; or when the feedback related signal exceeds the boost ramp signal, the modulation control circuit controls the power switch circuit to enter to a third state and the power switch circuit maintains in the third state for the second constant ON time, and thereafter, the modulation control circuit controls the power switch circuit to enter to the first state and the power switch circuit maintains in the first state until the feedback related signal once again exceeds the boost ramp signal or until the feedback related signal does not exceed the buck ramp signal; wherein in the first state, the first terminal of the inductor is electrically connected to the input voltage, and the second terminal of the inductor is electrically connected to the output voltage; wherein in the second state, the first terminal of the inductor is electrically connected to the ground, and the second terminal of the inductor is electrically connected to the output voltage; wherein in the third state, the first terminal of the inductor is electrically connected to the input voltage, and the second terminal of the inductor is electrically connected to the ground.

In one embodiment, the step of controlling the switching operations of the first terminal and the second terminal of the inductor further includes: after the power switch circuit enters to the first state and the power switch circuit maintains in the first state for the first constant ON time, when the feedback related signal exceeds the buck ramp signal, the power switch circuit maintains in the first state until the feedback related signal does not exceed the buck ramp signal or until the feedback related signal exceeds the boost ramp signal.

In one embodiment, the step of controlling the switching operations of the first terminal and the second terminal of the inductor further includes: after the power switch circuit maintains in the first state until the feedback related signal does not exceed the buck ramp signal, controlling the power switch circuit to enter to the second state and the power switch circuit maintains in the second state for a minimum OFF time.

In one embodiment, the step of controlling the switching operations of the first terminal and the second terminal of the inductor further includes: when the first constant ON time ends, and when the feedback related signal exceeds the buck ramp signal such that the power switch circuit is required to maintain in the first state, a switching frequency of the power switch circuit is decreased as the power switch circuit maintains in the first state, wherein a lower limit of the switching frequency is correlated with at least one of the following parameters: a slope of the buck ramp signal, a peak-to-peak value of the buck ramp signal, a slope of the boost ramp signal and/or a peak-to-peak value of the boost ramp signal.

In one embodiment, the step of controlling the switching operations of the first terminal and the second terminal of the inductor according to a comparison result between a feedback related signal related to the output voltage and a comparison result between the feedback related signal and the boost ramp signal includes: comparing the feedback related signal with a difference of the buck ramp signal minus an offset, or comparing the feedback related signal with a sum of the boost ramp signal plus the offset.

In one embodiment, the step of controlling the switching operations of the first terminal and the second terminal of the inductor further includes: when the first constant ON time ends, and when the feedback related signal exceeds the buck ramp signal such that the power switch circuit is required to maintain in the first state, a switching frequency of the power switch circuit is decreased as the power switch circuit maintains in the first state, wherein a lower limit of the switching frequency is correlated with the offset corresponding to the buck ramp signal or the offset corresponding to the boost ramp signal.

In one embodiment, the offset corresponding to the buck ramp signal is smaller than the peak-to-peak value of the buck ramp signal, or wherein the offset corresponding to the boost ramp signal is smaller than the peak-to-peak value of the boost ramp signal.

In one embodiment, the step of generating the buck ramp signal and the boost ramp signal includes: switching an emulation buck switching node between the input voltage and the ground synchronously with the switching of the first terminal of the inductor between the input voltage and the ground; dividing a voltage at the emulation buck switching node according to a predetermined ratio, so as to generate a buck divided voltage; executing integration on the buck divided voltage according to the switching of the first terminal of the inductor, so as to generate the buck ramp signal; switching an emulation boost switching node between the output voltage and the ground synchronously with the switching of the second terminal of the inductor between the output voltage and the ground; dividing a voltage difference between a voltage at the emulation boost switching node and the input voltage according to the predetermined ratio, so as to generate a boost divided voltage; executing integration on the boost divided voltage to the switching of the second terminal of the inductor, so as to generate the boost ramp signal.

The objectives, technical details, features, and effects of the present invention will be better understood with regard to the detailed description of the embodiments below, with reference to the attached drawings.

BRIEF DESCRIPTION OF THE DRAWINGS

FIG. 8A shows a circuit configuration of a constant time buck-boost switching converter according to another specific embodiment of the present invention, whereas.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
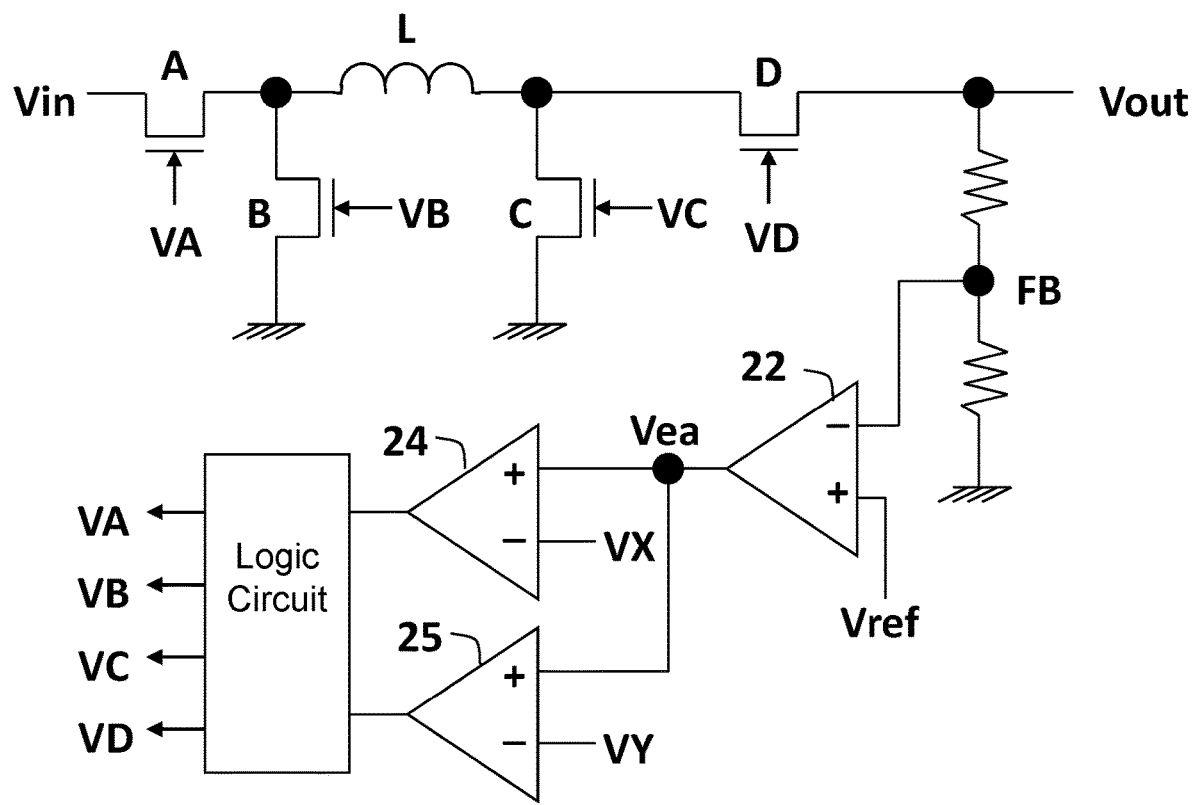
FIG. 1A and FIG. 1B show a schematic diagram of a conventional buck-boost switching converter.
Figure 1B:
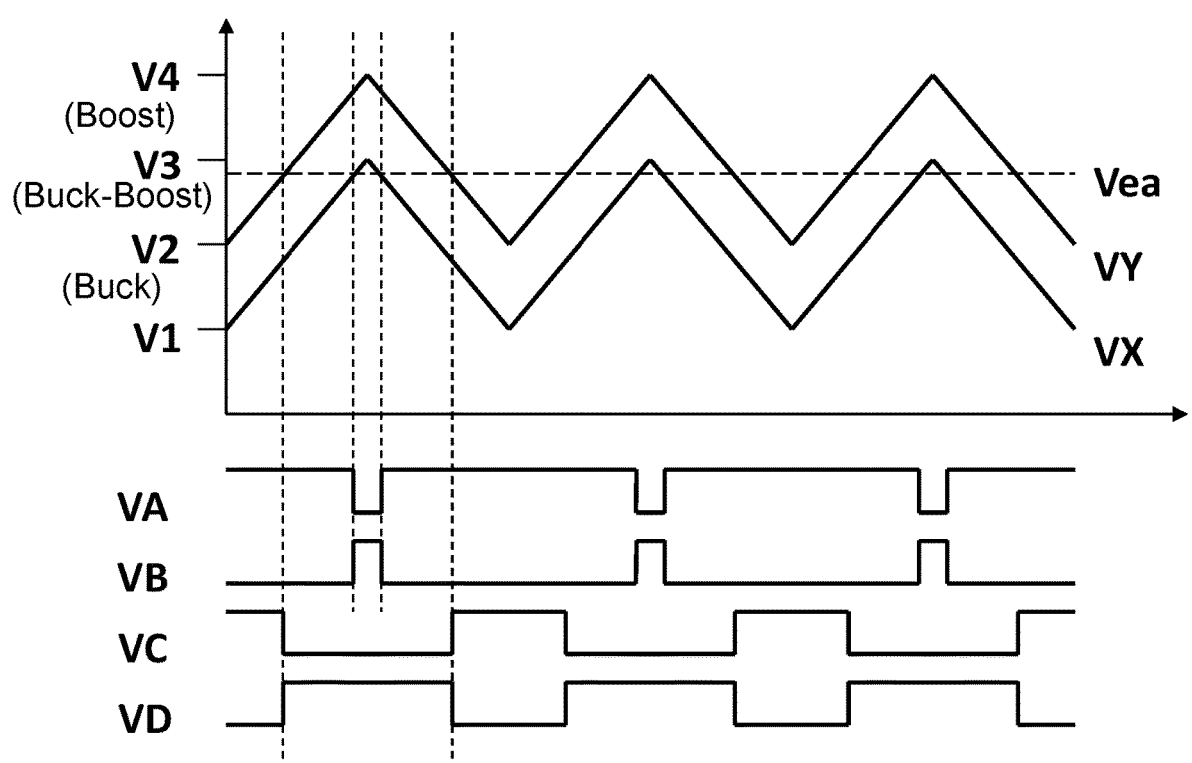
Figure 2A:
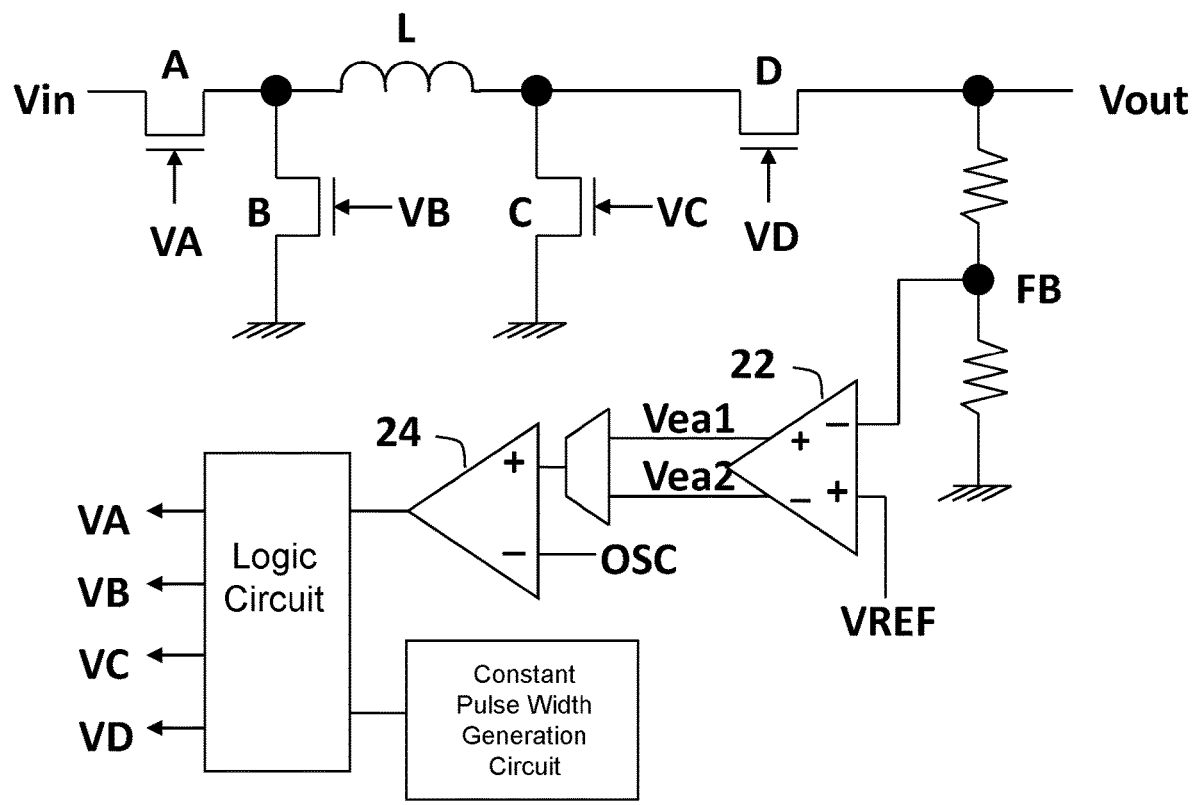
FIG. 2A and FIG. 2B show a schematic diagram of a conventional buck-boost switching converter.
Figure 2B:
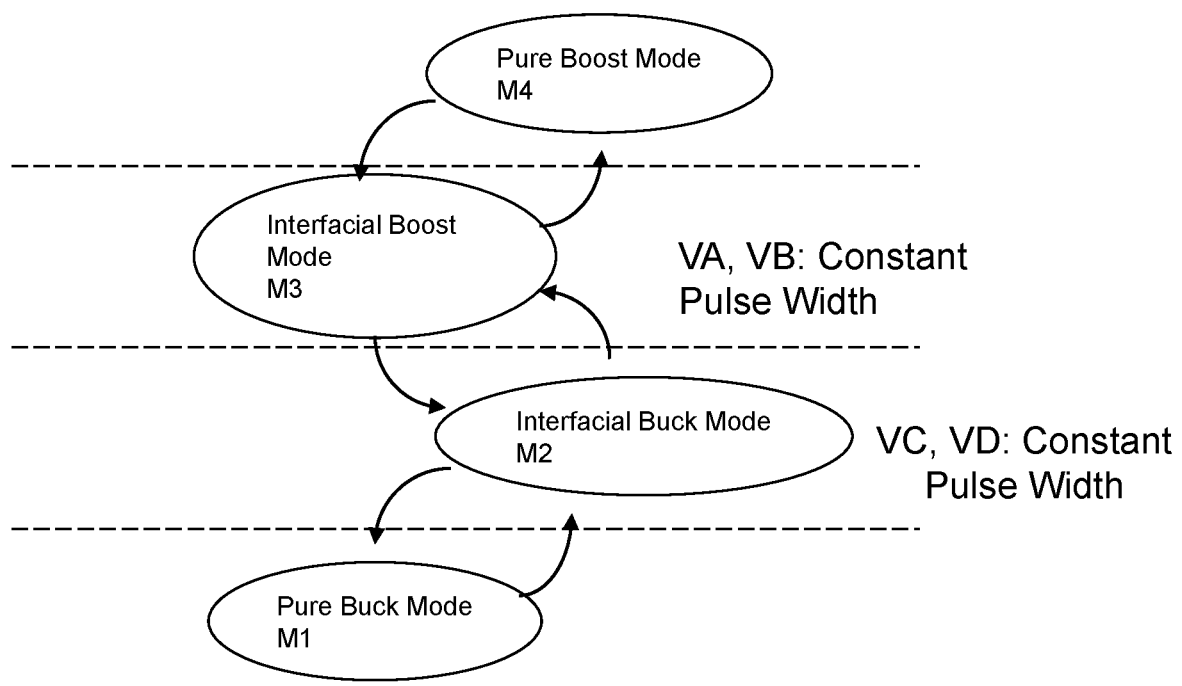
Figure 3A:
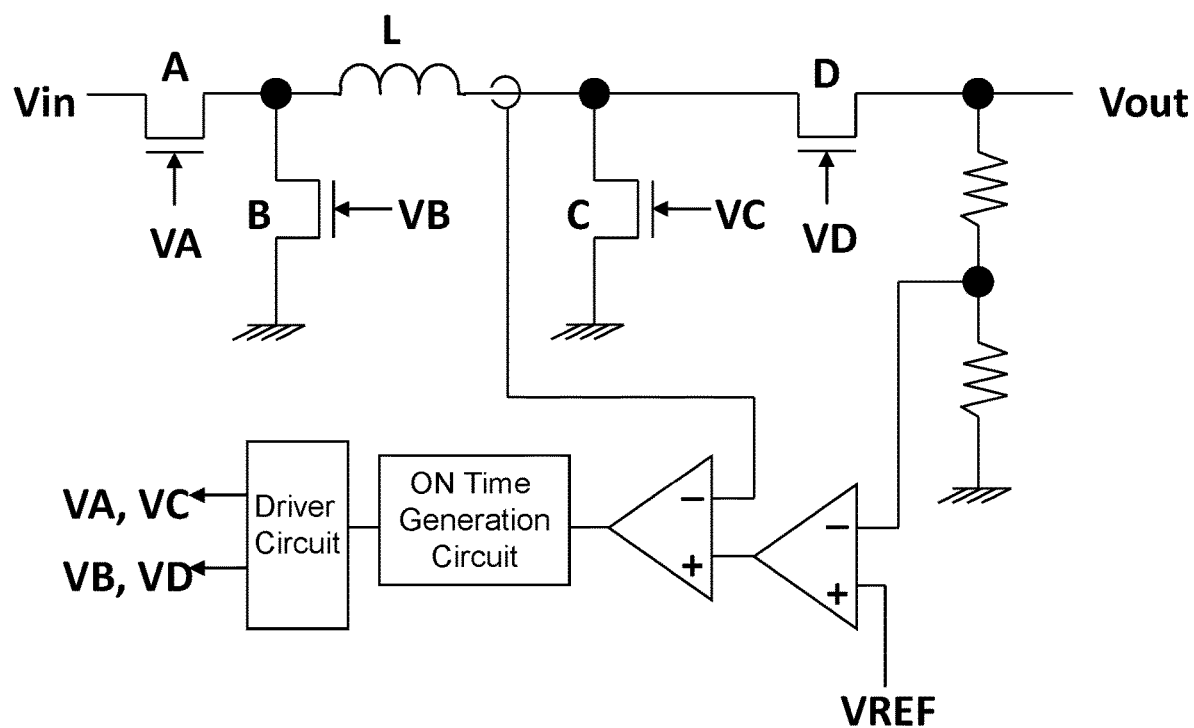
FIG. 3A to FIG. 3C show a schematic diagram of a conventional buck-boost switching converter.
Figure 3B:
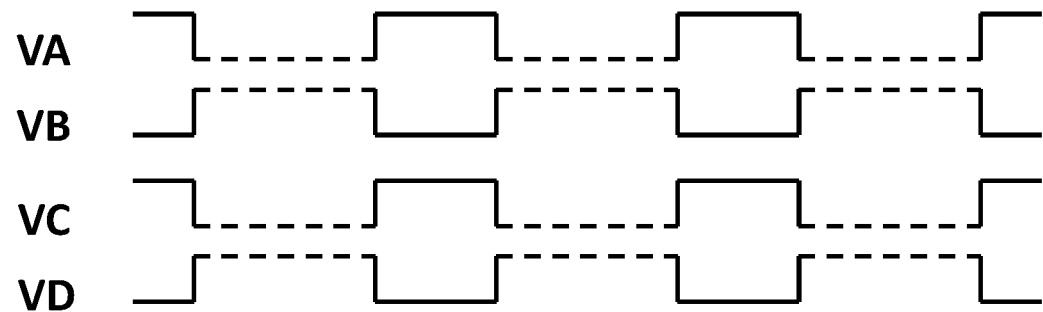
Figure 3C:
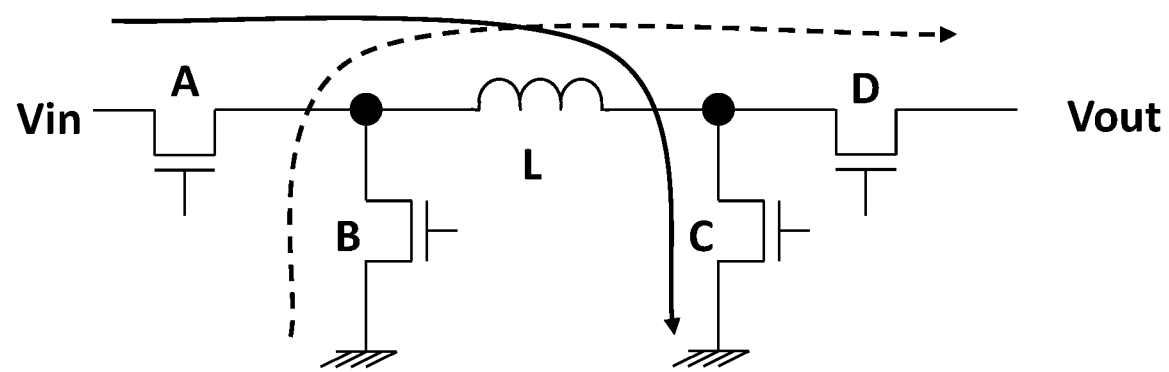
Figure 4:
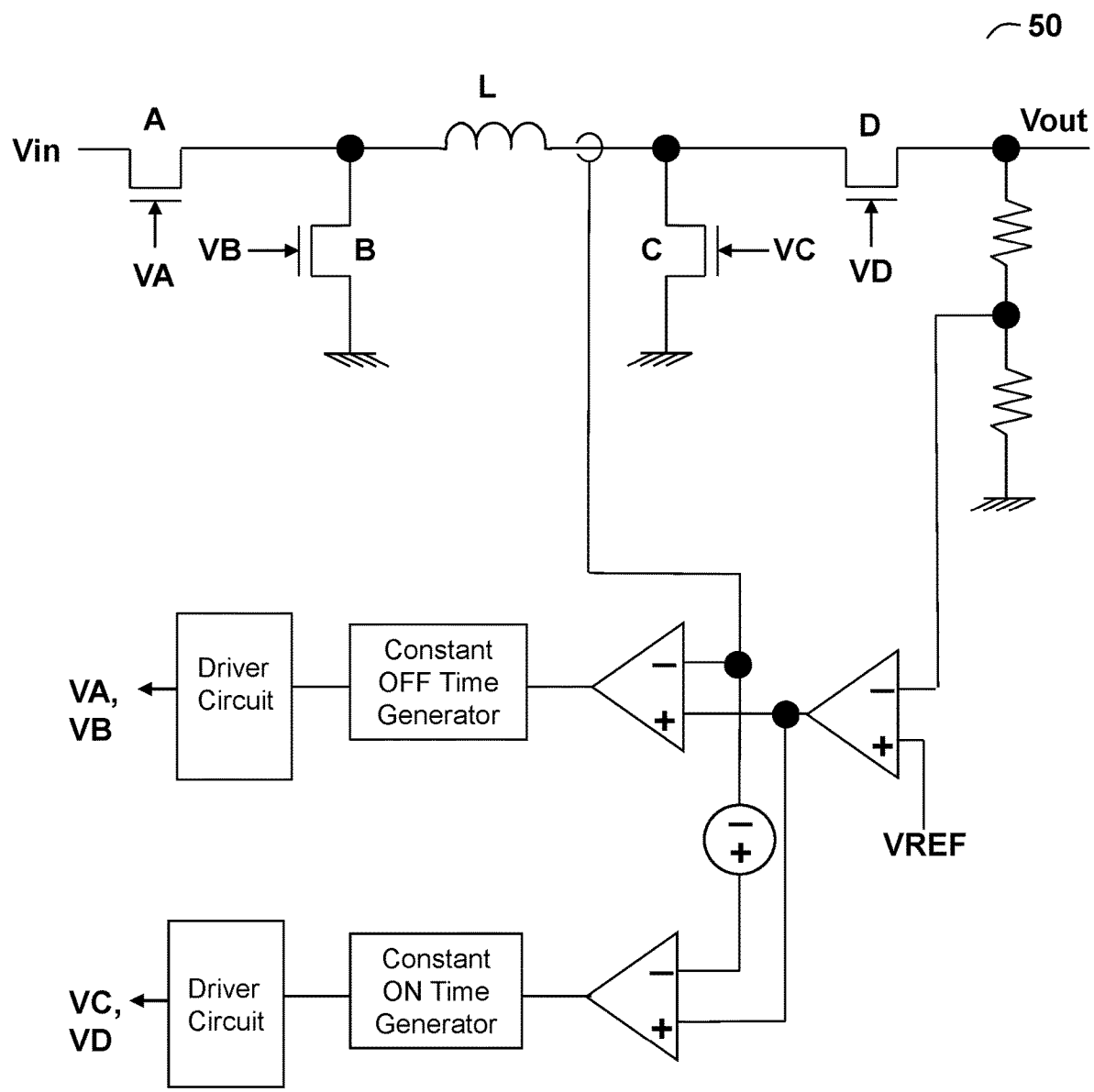
FIG. 4 shows a schematic diagram of a conventional buck-boost switching converter.
Figure 5:
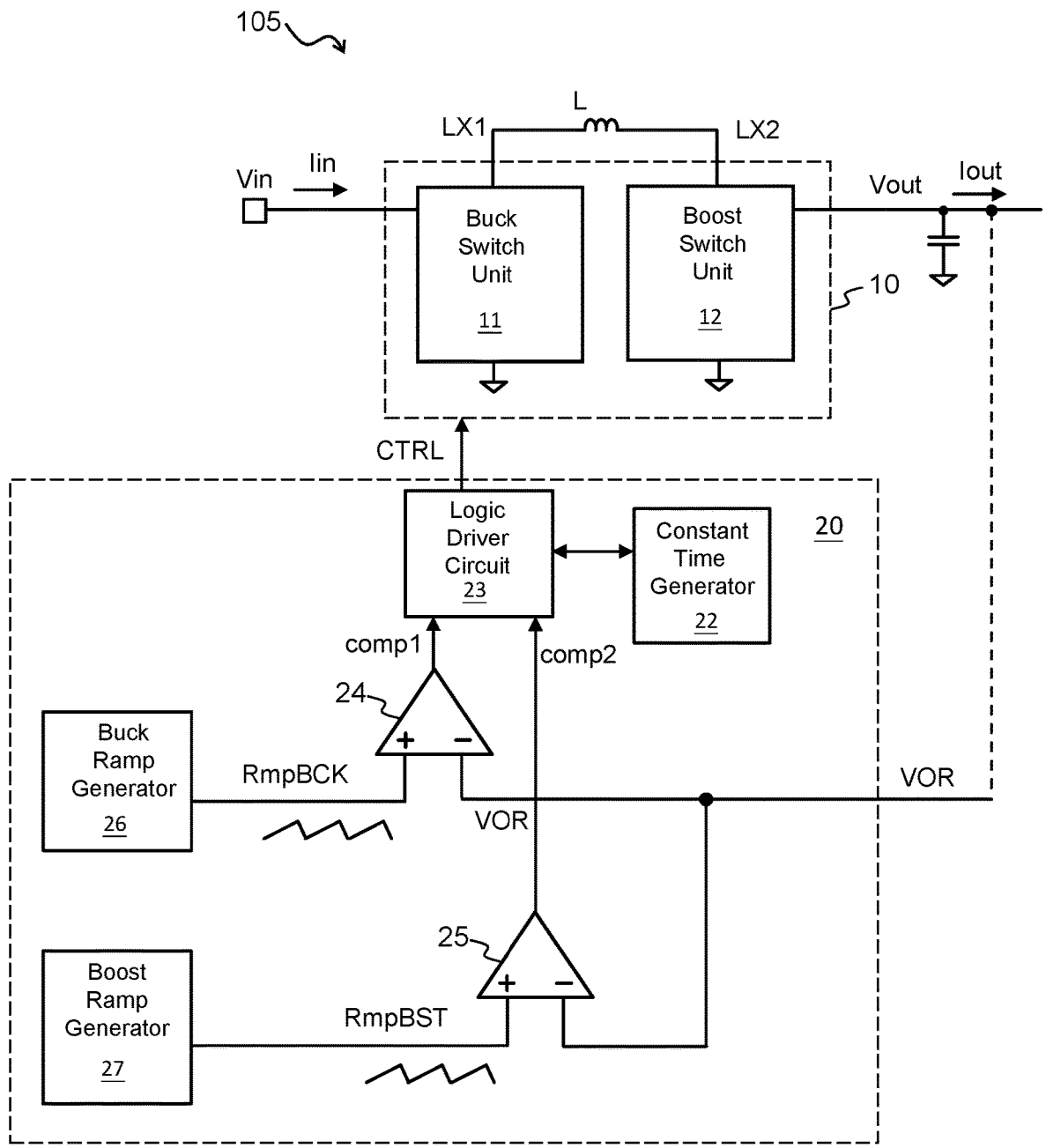
FIG. 5 shows a schematic block diagram of a constant time buck-boost switching converter according to an embodiment of the present invention.

Please refer to FIG. 5, which shows a schematic block diagram of a constant time buck-boost switching converter according to an embodiment of the present invention. The constant time buck-boost switching converter 105 is configured to operably convert an input power (corresponding to an input voltage Vin and an input current Iin) to an output power (corresponding to an output voltage Vout and an input current Iout). The constant time buck-boost switching converter 105 comprises: a power switch circuit 10 and a modulation control circuit 20.

The power switch circuit 10 includes: a buck switch unit 11 and a boost switch unit 12. The buck switch unit 11 is configured to operably switch a first terminal LX1 of an inductor L between the input voltage Vin and a ground. The boost switch unit 12 is configured to operably switch a second terminal LX2 of the inductor L between the output voltage Vout and the ground.

In one embodiment, the modulation control circuit 20 includes: a constant time generator 22, a logic driver circuit 23, a comparator 24, a comparator 25, a buck ramp generator 26 and a boost ramp generator 27.

The buck ramp generator 26 is configured to operably generate a buck ramp signal RmpBCK, whereas, the boost ramp generator 27 is configured to operably generate a boost ramp signal RmpBST. The comparator 24 is configured to operably compare a feedback related signal VOR of the output power with the buck ramp signal RmpBCK, so as to generate a comparison result comp1. The comparator 25 is configured to operably compare a feedback related signal VOR related to the output power with the boost ramp signal RmpBST, so as to generate a comparison result comp2.

The constant time generator 22 is configured to operably generate time signals indicative of constant times, such as a first constant time, a second constant time and a minimum OFF time, the details of which will be described later.

The logic driver circuit 23 is configured to operably generate a control signal CTRL according to the comparison result comp1, the comparison result comp2 and the time signals generated by the constant time generator 22, so as to control the buck switch unit 11 and the boost switch unit 12, and to thereby convert the input voltage Vin to the output voltage Vout.

Figure 6:
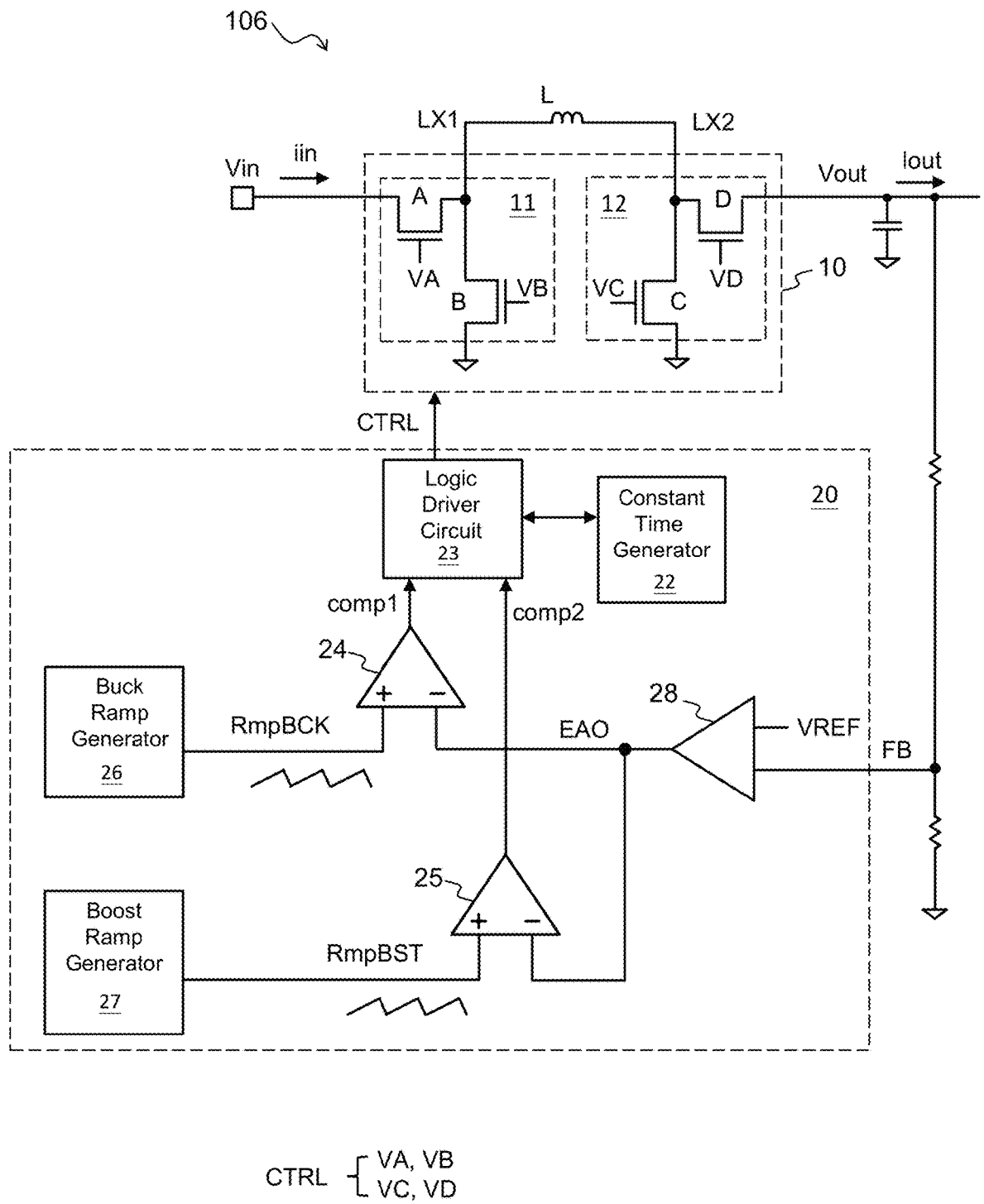
FIG. 6 shows a circuit configuration of a constant time buck-boost switching converter according to a specific embodiment of the present invention.

Please refer to FIG. 6, which shows a circuit configuration of a constant time buck-boost switching converter (i.e., constant time buck-boost switching converter 106) according to a specific embodiment of the present invention. In this embodiment, the buck switch unit 11 includes: a power switch A and a power switch B, which are controlled by a control signal VA and a control signal VB, respectively, wherein the power switch A and the power switch B is configured to operably switch the first terminal LX1 of the inductor L between the input voltage Vin and the ground. The boost switch unit 12 includes: a power switch C and a power switch D, which are controlled by a control signal VC and a control signal VD, respectively, wherein the power switch A and the power switch B is configured to operably switch the second terminal LX2 of the inductor L between the output voltage Vout and the ground.

Please still refer to FIG. 6. In one embodiment, the modulation control circuit 20 further includes an error amplifier 28, which is configured to operably generate an error amplification signal EAO (corresponding to the above-mentioned feedback related signal VOR) according to a difference between a reference signal VREF and a feedback signal FB. In one embodiment, the feedback signal FB can be for example a divided voltage of the output voltage Vout. The modulation control circuit 20 of this embodiment regulates the output voltage Vout to a predetermined voltage level via the error amplifier 28. In another embodiment, the feedback signal can be a signal correlated with the output current Iout. In this case, the modulation control circuit 20 regulates the output current Iout to a predetermined current level.

According to the present invention, the following relationships exist between the buck ramp signal RmpBCK and the boost ramp signal RmpBST and among the buck ramp signal RmpBCK, the boost ramp signal RmpBST, the input voltage Vin and the output voltage Vout, so as to achieve a more desirable power conversion efficacy:

In one embodiment, an average voltage level of the buck ramp signal RmpBCK is equal to a product of the output voltage Vout multiplied by a predetermined ratio K. An upper limit of a voltage level of the buck ramp signal RmpBCK is equal to a product of the input voltage Vin multiplied by the predetermined ratio K. An average voltage level of the boost ramp signal RmpBST is equal to a product of the output voltage Vout multiplied by the predetermined ratio K. A lower limit of a voltage level of the boost ramp signal RmpBST is equal to a product of the input voltage Vin multiplied by the predetermined ratio K. The voltage level of the boost ramp signal RmpBST is higher than the voltage level of the buck ramp signal RmpBCK.

Figure 7:
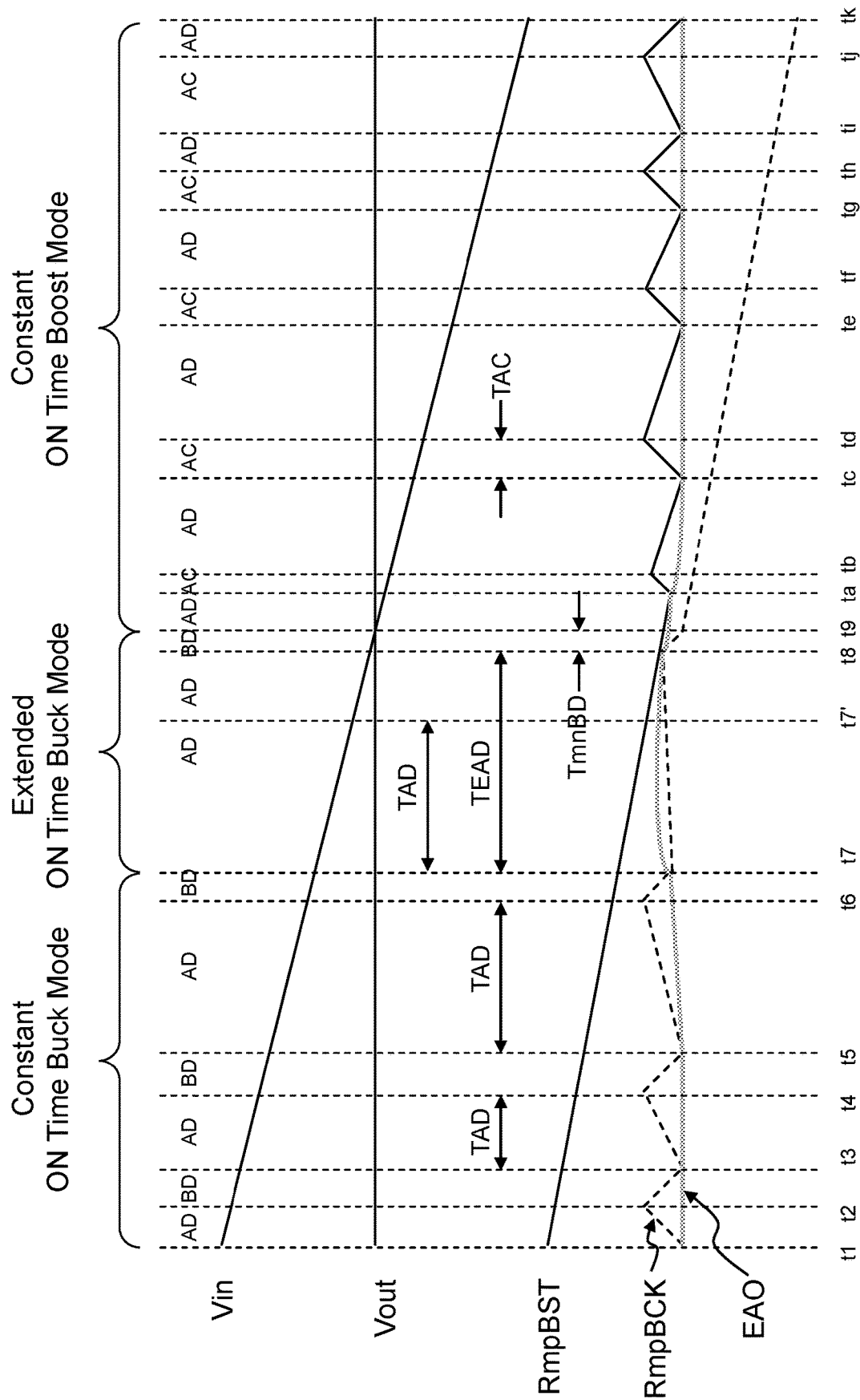
FIG. 7 illustrates a signal waveform diagram depicting the operation of a constant time buck-boost switching converter according to an embodiment of the present invention.

Please refer to FIG. 6 in conjugation with FIG. 7. FIG. 7 illustrates a signal waveform diagram depicting the operation of a constant time buck-boost switching converter according to an embodiment of the present invention.

In this embodiment, the input voltage Vin is decreased as time is increased. The output voltage Vout is being regulated at a constant predetermined level by feedback control. In one embodiment, as shown in FIG. 7, when the input voltage Vin is far greater than the output voltage Vout (i.e., when the error amplification signal EAO does not exceed the buck ramp signal RmpBCK and also does not exceed the boost ramp signal RmpBST (e.g., from the time point t1 to the time point t7)), the modulation control circuit 20 controls the power switch circuit 10 to operate in a constant ON time buck conversion mode via a first constant ON time TAD.

To elaborate in more detail, as exemplified by the embodiment shown in FIG. 6 and the embodiment shown in FIG. 7, when the buck ramp signal RmpBCK is decreased to intersect with the error amplification signal EAO (e.g., at the time point t3), the modulation control circuit 20 controls the power switch circuit 10 to enter to a first state (as shown by AD in FIG. 7) and the power switch circuit 10 maintains in the first state AD for a first constant ON time TAD. Under such situation, the power switch A and the power switch D are ON for the first constant ON time TAD, while in the meantime, the power switch B and the power switch C are OFF for the first constant ON time TAD, whereby the first terminal LX1 of the inductor L is electrically connected to the input voltage Vin, and the second terminal LX2 of the inductor L is electrically connected to the output voltage Vout.

Subsequently, after the first constant ON time TAD ends, if the error amplification signal EAO does not exceed the buck ramp signal RmpBCK (e.g., at the time point t4), the modulation control circuit 20 controls the power switch circuit 10 to enter to a second state (as shown by BD in FIG. 7). In the second state, the power switch A and the power switch D are OFF, whereas, the power switch B and the power switch C are ON. And, the power switch circuit 10 maintains in the second state until the buck ramp signal RmpBCK once again intersects with the error amplification signal EAO. As thus, the constant time buck-boost switching converter 106 operates in the constant ON time buck conversion mode.

In one embodiment, the above-mentioned first constant ON time TAD can be a predetermined constant time. That is, regardless what ratio of the input voltage Vin to the output voltage Vout is, the first constant ON time TAD always has a constant time length.

In another embodiment, the above-mentioned first constant ON time TAD can be adjusted according to different conditions of the input voltage Vin and the output voltage Vout, so as to reduce a switching frequency variation caused by a variation of the ratio of the input voltage Vin to the output voltage Vout, and in one embodiment, the switching frequency can be maintained stable thereby. Note that in such embodiment, under a given input voltage Vin and a given output voltage Vout, the first constant ON time TAD has a corresponding constant time length. For example, under a given input voltage Vin and a given output voltage Vout, during transient load variation, a switching duty ratio of the power switches A and D may vary according to the load variation, but even under such situation, the first constant ON time TAD still has a corresponding constant time length. On the contrary, the ON time wherein both the power switch B and the power switch D are ON is variable.

On the other hand, when the input voltage Vin is smaller than the output voltage Vout, that is, when the error amplification signal EAO exceeds the buck ramp signal RmpBCK and exceeds the boost ramp signal RmpBST (e.g., from the time point tc to the time point tk; particularly at the time points tc, te, tg, and ti), the modulation control circuit 20 controls the power switch circuit 10 to operate in a constant ON time boost conversion mode (e.g., from the time point t1 to the time point t7) according to a second constant ON time TAC.

To elaborate in more detail, as exemplified by the embodiment shown in FIG. 6 and the embodiment shown in FIG. 7, when the boost ramp signal RmpBST is decreased to intersect with the error amplification signal EAO (e.g., at the time point ta), the modulation control circuit 20 controls the power switch circuit 10 to enter to a third state (as shown by AC in FIG. 7) and the power switch circuit 10 maintains in the third state AC for the second constant ON time TAC. That is, under such situation, the power switch A and the power switch C are ON for the second constant ON time TAC, while in the meantime, the power switch B and the power switch D are OFF for the second constant ON time TAC, so that the first terminal LX1 of the inductor L is electrically connected to the input voltage Vin, and the second terminal LX2 of the inductor L is electrically connected to the output voltage Vout.

Subsequently, after the second constant ON time TAC ends, the modulation control circuit 20 controls the power switch circuit 10 to enter to first state AD and the power switch circuit 10 maintains in the first state AD until the boost ramp signal RmpBST once again intersects with the error amplification signal EAO, so that the constant time buck-boost switching converter 106 operates in the constant ON time boost conversion mode (e.g., from the time point ta to the time point tk).

In one embodiment, the above-mentioned second constant ON time TAC can be a predetermined constant time. That is, regardless what ratio of the input voltage Vin to the output voltage Vout is, the second constant ON time TAC always has a constant time length.

In one embodiment, the above-mentioned second constant ON time TAC can be adjusted according to different conditions of the input voltage Vin and the output voltage Vout, so as to reduce a switching frequency variation caused by a variation of the ratio of the input voltage Vin to the output voltage Vout, and in one embodiment, the switching frequency can be maintained stable thereby. Note that in such embodiment, under a given input voltage Vin and a given output voltage Vout, the second constant ON time TAC has a corresponding constant time length. For example, under a given input voltage Vin and a given output voltage Vout, during transient load variation, a switching duty ratio of the power switches A and C may vary according to the load variation, but even under such situation, the first constant ON time TAD still has a corresponding constant time length. On the contrary, the ON time wherein both the power switch A and the power switch D are ON is variable.

Please still refer to FIG. 6 and FIG. 7. In one embodiment, after the power switch circuit 10 enters to the first state AD and maintains in the first state AS for the first constant ON time TAD, if the error amplification signal EAO exceeds the buck ramp signal RmpBCK (e.g., at the time point t7'), which indicates that the input voltage and the output voltage are close to each other, the power switch circuit 10 maintains in the first state AD, and under such circumstance, the constant time buck-boost switching converter 106 operates in an extended ON time buck conversion mode, wherein the power switch circuit 10 maintains in the first state AD, until the error amplification signal EAO does not exceed the buck ramp signal RmpBCK (i.e., until the constant time buck-boost switching converter 106 enters to the constant ON time buck conversion mode), or, until the error amplification signal EAO exceeds the boost ramp signal RmpBST (i.e., until the constant time buck-boost switching converter 106 enters to the constant ON time boost conversion mode).

It is worthwhile mentioning that, according to the present invention, when the input voltage Vin and the output voltage Vout are close to each other, the first state AD can be extended, so as to reduce the switching frequency, thus reducing switching loss and enhancing power conversion efficiency. On the other hand, the switching frequency can have a lower limit so that it will not be decreased unlimitedly, so that there can be a balance between power conversion efficiency and output ripple. The correlation between the lower limit of the switching frequency and circuit parameters will be described in detail later.

Please still refer to FIG. 7. When the power switch circuit operates in the extended ON time buck conversion mode, in one embodiment, after the first state AD has extended until the error amplification signal EAO does not exceed the buck ramp signal RmpBCK, the modulation control circuit 20 controls the power switch circuit 10 to enter to the second state BD and the power switch circuit 10 maintains in the second state BD for a minimum OFF time TmnBD. As a result, it can be ensured that, for example, a bootstrap capacitor of a bootstrap driver circuit can be sufficiently charged, thus ensuring the bootstrap driver circuit to operate normally.

When the power switch circuit 10 operates in the extended ON time buck conversion mode, the switching frequency of the power switch circuit 10 is decreased as the power switch circuit 10 keeps staying in the first state AD. In one embodiment, the lower limit of the switching frequency is correlated with at least one of following parameters: a slope of the buck ramp signal RmpBCK, a peak-to-peak value of the buck ramp signal RmpBCK, a slope of the boost ramp signal RmpBST and/or a peak-to-peak value of the boost ramp signal RmpBST.

Figure 8A:
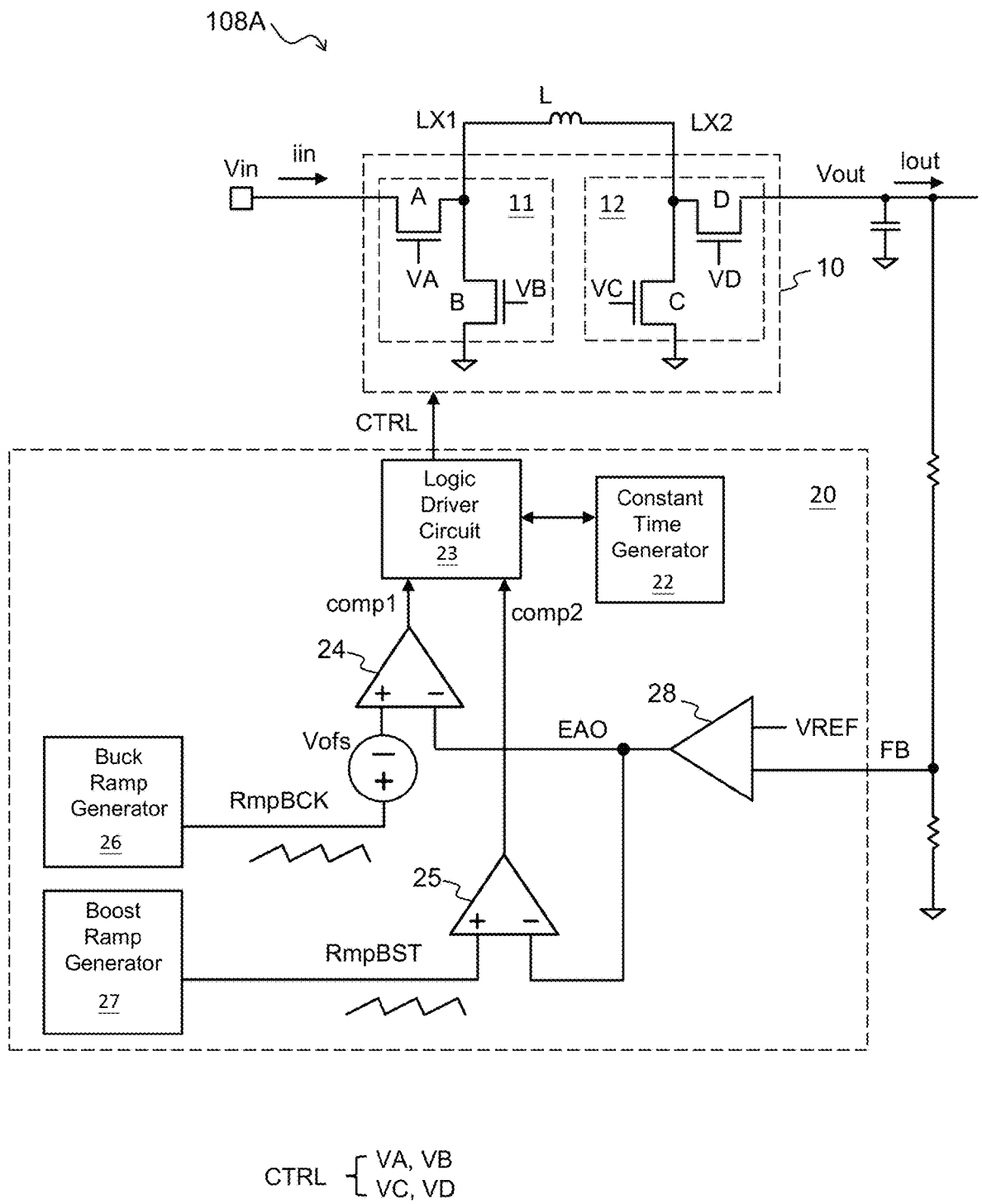
Figure 8B:
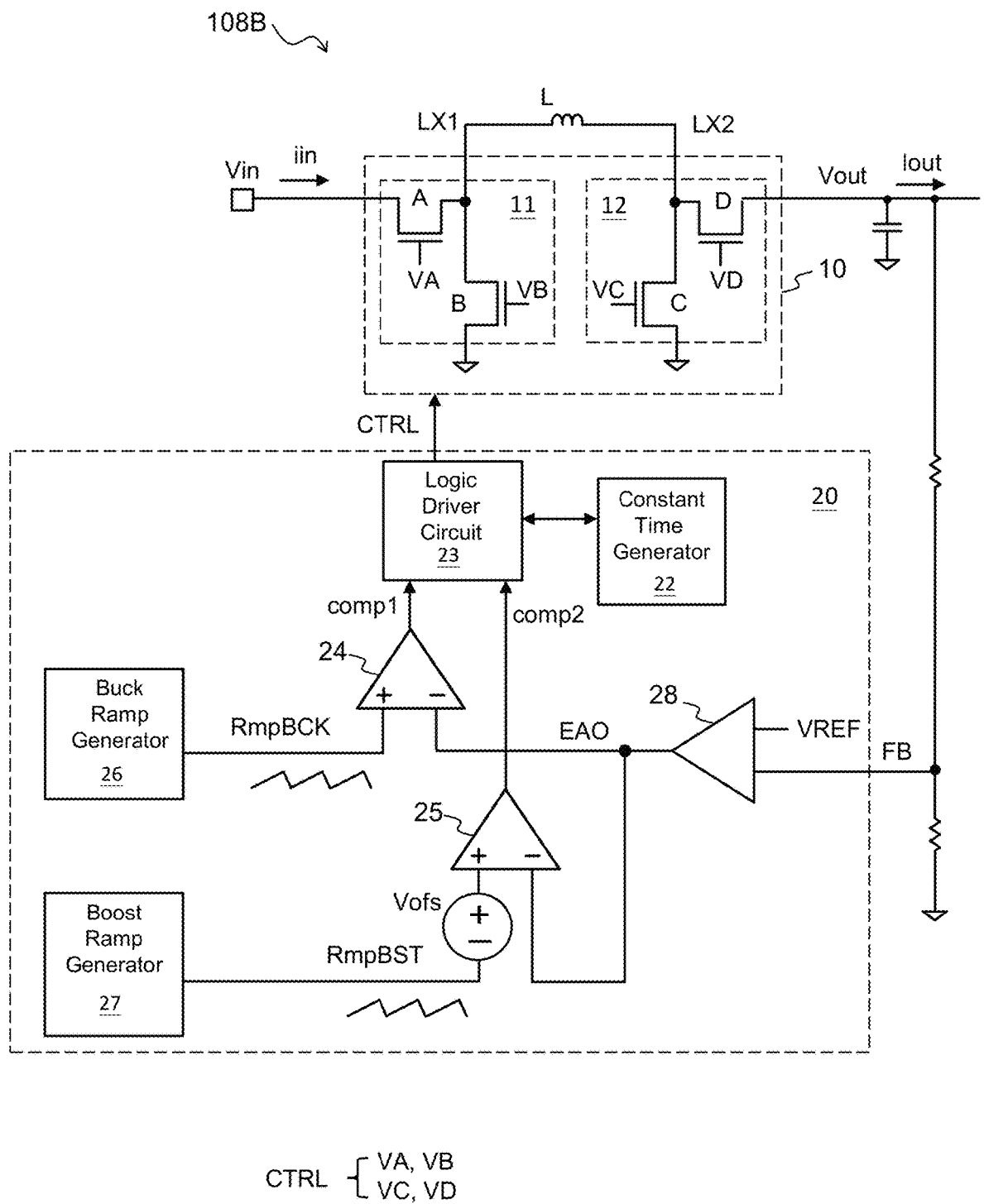
FIG. 8B shows a circuit configuration of a constant time buck-boost switching converter according to yet another specific embodiment of the present invention.

Please refer to FIG. 8A and FIG. 8B. FIG. 8A shows a circuit configuration of a constant time buck-boost switching converter (i.e., constant time buck-boost switching converter 108A) according to another specific embodiment of the present invention, whereas, FIG. 8B shows a circuit configuration of a constant time buck-boost switching converter (i.e., constant time buck-boost switching converter 108B) according to yet another specific embodiment of the present invention. In the embodiment of FIG. 8A, the error amplification signal EAO is compared with a difference of the buck ramp signal RmpBCK minus an offset Vofs. In the embodiment of FIG. 8B, the error amplification signal EAO is compared with a sum of the boost ramp signal RmpBST plus the offset Vofs.

Please still refer to FIG. 8A and FIG. 8B. When the power switch circuit 10 operates in the extended ON time buck conversion mode, the switching frequency of the power switch circuit 10 is decreased as the power switch circuit 10 keeps staying in the first state AD. In a case when the buck ramp signal RmpBCK or the boost ramp signal RmpBST has an offset, the lower limit of the switching frequency is correlated with the offset corresponding to the buck ramp signal RmpBCK or the offset corresponding to the boost ramp signal RmpBST.

In one embodiment, the offset Vofs of the buck ramp signal RmpBCK is smaller than the peak-to-peak value of the buck ramp signal RmpBCK. In one embodiment, the offset Vofs of the boost ramp signal RmpBST is smaller than the peak-to-peak value of the boost ramp signal RmpBST. In a case when the offset Vofs is smaller than the peak-to-peak value of the corresponding ramp signal, it can be ensured that when the input voltage Vin and the output voltage Vout are close to each other, the switching frequency of the power switch circuit 10 is decreased as the power switch circuit 10 keeps staying in the first state AD, while on the other hand, it can also be ensured that the first state AD will not be extended unlimitedly, that is, the switching frequency will have a finite lower limit. Moreover, the conversion time and response time between the above-mentioned conversion modes can be improved.

Figure 9A:
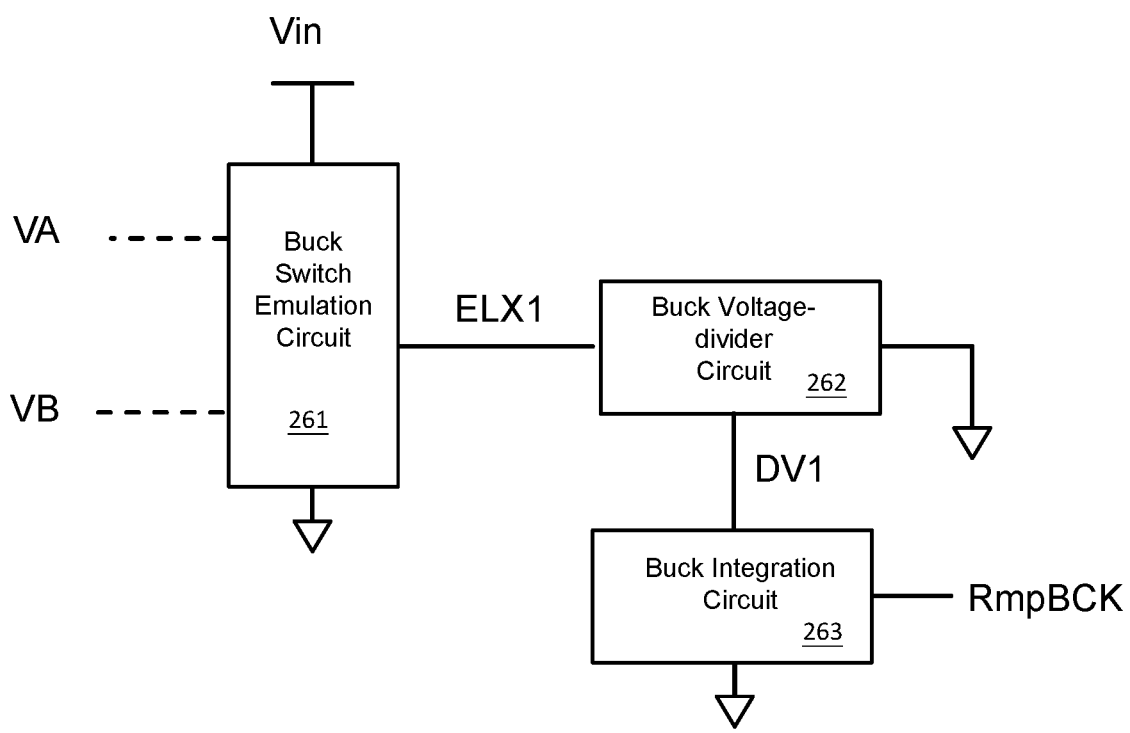
FIG. 9A shows a schematic circuit diagram of a buck ramp generator in a constant time buck-boost switching converter according to an embodiment of the present invention.

Please refer to FIG. 9A, which shows a schematic circuit diagram of a buck ramp generator (i.e., buck ramp generator 269A) in a constant time buck-boost switching converter according to an embodiment of the present invention. The buck ramp generator 269A includes: a buck switch emulation circuit 261, a buck voltage-divider circuit 262 and a buck integration circuit 263. The buck switch emulation circuit 261 is configured to operably switch an emulation buck switching node ELX1 between the input voltage Vin and the ground synchronously when the buck switch unit 11 switches the first terminal LX1 of the inductor L between the input voltage Vin and the ground. In the above-mentioned constant ON time buck conversion mode, because an average voltage of the emulation buck switching node ELX1 is equal to a product of the input voltage Vin multiplied by the duty ratio, the average voltage of the emulation buck switching node ELX1 is equal to the output voltage Vout. The buck voltage-divider circuit 262 is configured to operably divide a voltage at the emulation buck switching node ELX1 according to a predetermined ratio K, so as to generate a buck divided voltage DV1. The buck integration circuit 263 is configured to operably integrate the buck divided voltage DV1 to generate the buck ramp signal RmpBCK, the details of which will be described in detail later.

Figure 9B:
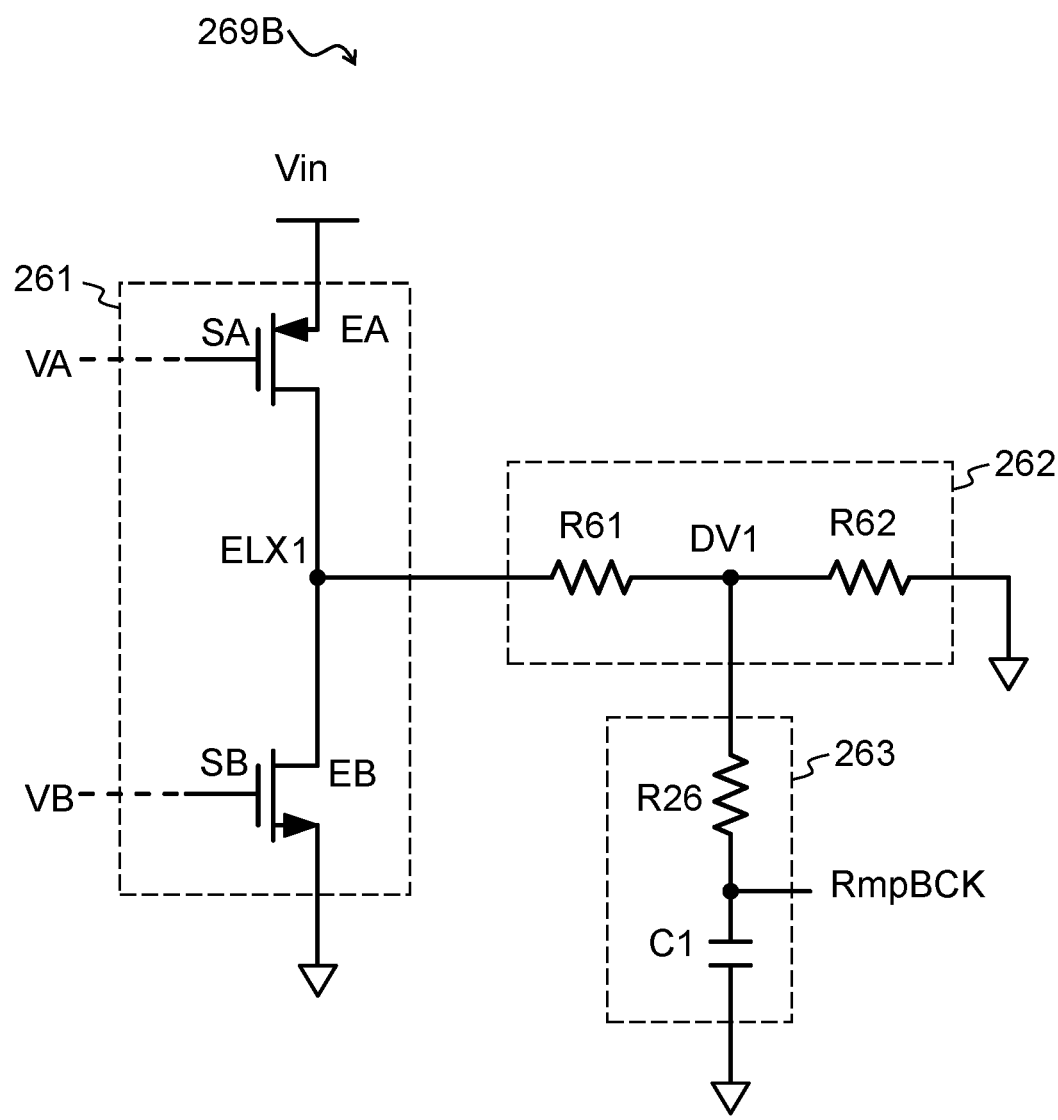
FIG. 9B shows a schematic circuit diagram of a buck ramp generator in a constant time buck-boost switching converter according to a specific embodiment of the present invention.

Please refer to FIG. 9B, which shows a schematic circuit diagram of a buck ramp generator (i.e., buck ramp generator 269B) in a constant time buck-boost switching converter according to a specific embodiment of the present invention.

In this embodiment, the buck switch emulation circuit 261 includes an emulation buck upper gate switch EA and an emulation buck lower gate switch EB which are connected in series between the input voltage Vin and the ground, wherein the emulation buck upper gate switch EA and the emulation buck lower gate switch EB are respectively controlled by a control signal SA and a control signal SB which are synchronous to a control signal VA and a control signal VB. Thus, the voltage at the emulation buck switching node ELX1 where the emulation buck upper gate switch EA and the emulation buck lower gate switch EB are coupled to each other can emulate the voltage at the first terminal LX1 of the inductor L.

The buck voltage-divider circuit 262 includes for example a resistor R61 and a resistor R62, for dividing a voltage at the emulation buck switching node ELX1 according to the predetermined ratio K, to generate the buck divided voltage DV1.

In one embodiment, the buck integration circuit 263 includes a buck integration capacitor C1, which is charged or discharged by the buck divided voltage DV1 which varies according to a switching of the buck switch emulation circuit 261, so as to generate the buck ramp signal RmpBCK. In one embodiment, the buck integration circuit 263 further includes a buck integration resistor R26, wherein the buck integration resistor R26 and the buck integration capacitor C1 are connected in series between the divided voltage node of the buck voltage-divider circuit 262 and a ground. The buck integration resistor R26 is configured to operably determine a slope of the buck ramp signal RmpBCK.

It is worthwhile mentioning that, because the buck integration circuit 263 integrates a divided voltage having a predetermined ratio K of the emulation buck switching node ELX1, and because the average voltage of the emulation buck switching node ELX1 is equal to the output voltage Vout, the average of the buck ramp signal RmpBCK generated by the buck integration circuit 263 is equal to K*Vout. Besides, when a duty ratio of the emulation buck upper gate switch EA reaches 100%, the voltage at the emulation buck switching node ELX1 is equal to its upper limit, namely the input voltage Vin, so the buck ramp signal RmpBCK has an upper limit of K*Vin. Referring to FIG. 7, because the buck ramp signal RmpBCK has an upper limit of K*Vin, when the input voltage Vin is lower than the output voltage Vout (e.g., from the time point ta to the time point tk), the buck ramp signal RmpBCK will be equal to K*Vin. That is, when the input voltage Vin is lower than the output voltage Vout, the buck ramp signal RmpBCK is smaller than the boost ramp signal RmpBST, and the difference between the buck ramp signal RmpBCK and the boost ramp signal RmpBST becomes even larger as the input voltage Vin is decreased to become lower. Under such situation, the modulation control circuit 20 will control the operation of the power switch circuit 10 according to a relationship between the error amplification signal EAO and the boost ramp signal RmpBST, and the error amplification signal EAO will be ensured not to intersect with the buck ramp signal RmpBCK to trigger any unwanted switching between the conversion modes.

Figure 10A:
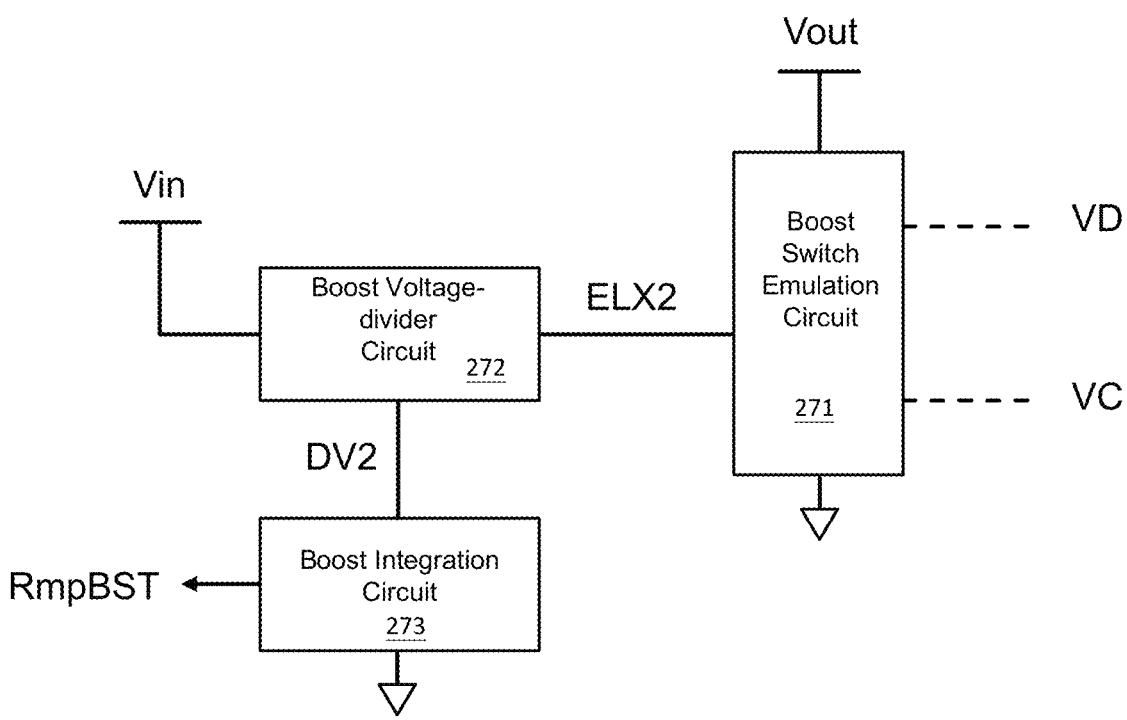
FIG. 10A shows a schematic circuit diagram of a boost ramp generator in a constant time buck-boost switching converter according to an embodiment of the present invention.

Please refer to FIG. 10A, which shows a schematic circuit diagram of a boost ramp generator (i.e., boost ramp generator 270A) in a constant time buck-boost switching converter according to an embodiment of the present invention. The boost ramp generator 270A includes: a boost switch emulation circuit 271, a boost voltage-divider circuit 272 and a boost integration circuit 273. The boost switch emulation circuit 271 is configured to operably switch an emulation boost switching node ELX2 between the output voltage Vout and the ground synchronously when the boost switch unit 12 switches the second terminal LX2 of the inductor L between the input voltage Vin and the ground. In the above-mentioned constant ON time boost conversion mode, the average voltage of the emulation switching node ELX2 is equal to the output voltage Vout. The boost voltage-divider circuit 272 is coupled between the input voltage Vin and the emulation boost switching node ELX2, wherein the boost voltage-divider circuit 272 is configured to operably divide a voltage difference between a voltage at the emulation boost switching node ELX2 and the input voltage Vin according to the predetermined ratio K, so as to generate a boost divided voltage DV2. The boost integration circuit 273 is configured to integrate the boost divided voltage DV2 to generate the boost ramp signal RmpBST, the details of which will be described later.

Figure 10B:
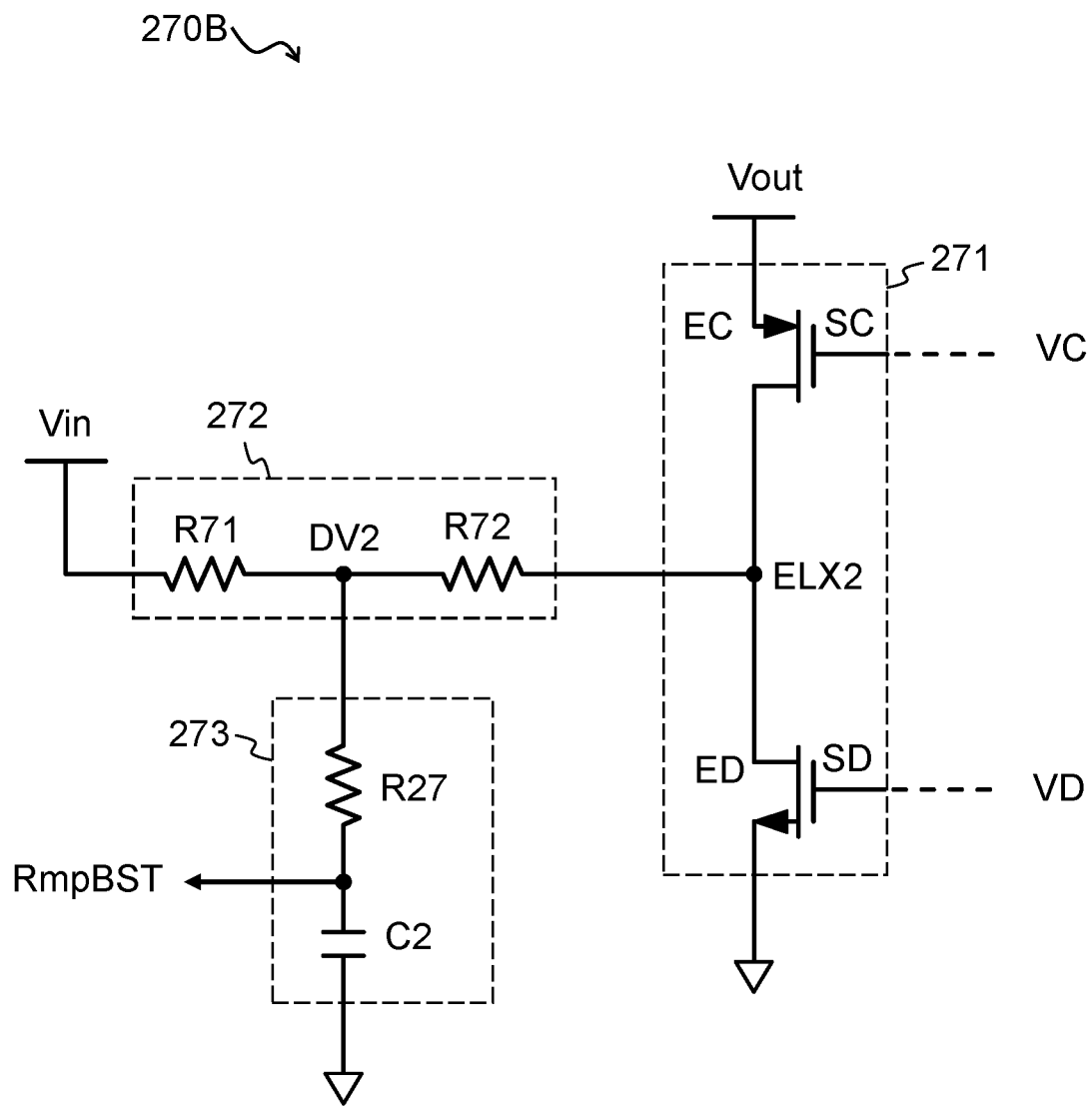
FIG. 10B shows a schematic circuit diagram of a boost ramp generator in a constant time buck-boost switching converter according to a specific embodiment of the present invention.

Please refer to FIG. 10B, which shows a schematic circuit diagram of a boost ramp generator (i.e., boost ramp generator 270B) in a constant time buck-boost switching converter according to a specific embodiment of the present invention.

In this embodiment, the boost switch emulation circuit 271 includes an emulation boost upper gate switch EC and an emulation boost lower gate switch ED which are connected in series between the output voltage Vout and the ground, wherein the emulation boost upper gate switch EC and the emulation boost lower gate switch ED are respectively controlled by a control signal SC and a control signal SD which are synchronous to a control signal VC and a control signal VD. As a result, the voltage at the emulation boost switching node ELX2 where the emulation boost upper gate switch EC and the emulation boost lower gate switch ED are coupled to each other can emulate the voltage at the second terminal LX2 of the inductor L. To elaborate in more detail, in this embodiment, the voltage at the emulation boost switching node ELX2 emulate a reversed-phase voltage at the second terminal LX2 of the inductor L.

The boost voltage-divider circuit 272 includes for example a resistor R71 and a resistor R72, which are configured to operably divide the voltage difference between a voltage at the emulation boost switching node ELX2 and the input voltage Vin according to the predetermined ratio K, so as to generate the boost divided voltage DV2.

In one embodiment, the boost integration circuit 273 includes a boost integration capacitor C2, which is charged or discharged by the boost divided voltage DV2 which varies according to a switching of the boost switch emulation circuit 271, so as to generate the boost ramp signal RmpBST. In one embodiment, the boost integration circuit 273 further includes a boost integration resistor R27, wherein the boost integration resistor R27 and the boost integration capacitor C2 are connected in series between a divided voltage node of the boost voltage-divider circuit 272 and a ground. The boost integration resistor R27 is configured to operably determine a slope of the boost ramp signal RmpBST.

It is worthwhile mentioning that, the above-mentioned voltage at the emulation boost switching node ELX2 is obtained by emulating a reversed-phase voltage at the second terminal LX2 of the inductor L, whereby the boost ramp signal RmpBST emulates an inductor current in a boost mode. On the other hand, the above-mentioned voltage at the emulation buck switching node ELX1 is obtained by emulating the voltage at the first terminal LX1 of the inductor L, whereby the buck ramp signal RmpBCK emulates an inductor current in a buck mode.

Besides, it is worthwhile mentioning that, because the boost switch emulation circuit 271 emulates a situation where the power switch circuit 10 operates in a constant ON time boost conversion mode, an average of the boost ramp signal RmpBST generated by the boost integration circuit 273 is equal to K*Vout. Besides, because a lower limit of the voltage at the emulation buck switching node ELX2 is equal to the input voltage Vin, a lower limit of the boost ramp signal RmpBST is equal to K*Vin. Please refer back to FIG. 7. According to the present invention, because the boost ramp signal RmpBST has a lower limit which is equal to K*Vin, when the input voltage Vin is higher than the output voltage Vout (e.g., from the time point t1 to the time point t7), the boost ramp signal RmpBST will be equal to K*Vin. That is, when the input voltage Vin is higher than the output voltage Vout, the boost ramp signal RmpBST is greater than the buck ramp signal RmpBCK. Under such situation, a difference between the buck ramp signal RmpBCK and the boost ramp signal RmpBST becomes larger as the input voltage Vin is increased to become higher. Under such situation, the modulation control circuit 20 will control the operation of the power switch circuit 10 according to a relationship between the error amplification signal EAO and the buck ramp signal RmpBCK. As a consequence, the error amplification signal EAO will be ensured not to intersect with the boost ramp signal RmpBST to trigger any unwanted switching between the conversion modes.

Note that, if an unwanted switching between the conversion modes occurs, an undesirable zero point located at the right portion of the plane will be generated, which will result in poor transient response. However, because the present invention can clearly separate the buck ramp signal RmpBCK from the boost ramp signal RmpBST as described above, any unwanted switching between the conversion modes can be avoided, thus ensuring a better transient response.

Besides, from one perspective, because the boost ramp signal RmpBST and the buck ramp signal RmpBCK are both proportional to the output voltage Vout, all conversion modes will operate by a lowest closed loop output impedance, to achieve fast load transient response and fast line transient response.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A constant time buck-boost switching converter, which is configured to operably convert an input voltage to an output voltage; the constant time buck-boost switching converter comprising:
    a power switch circuit including: a buck switch unit and a boost switch unit, wherein the buck switch unit is configured to operably switch a first terminal of an inductor between an input voltage and a ground, and wherein the boost switch unit is configured to operably switch a second terminal of the inductor between an output voltage and the ground; and
    a modulation control circuit, which is configured to operably generate a buck ramp signal and a boost ramp signal according to the input voltage and the output voltage and which is configured to operably control the buck switch unit and the boost switch unit according to a comparison between a feedback related signal related to the output voltage and the buck ramp signal and according to a comparison between the feedback related signal and the boost ramp signal, so as to convert the input voltage to the output voltage;
    wherein an average voltage level of the buck ramp signal is equal to a product of the output voltage multiplied by a predetermined ratio, wherein an upper limit of a voltage level of the buck ramp signal is equal to a product of the input voltage multiplied by the predetermined ratio, wherein an average voltage level of the boost ramp signal is equal to a product of the output voltage multiplied by the predetermined ratio, wherein a lower limit of a voltage level of the boost ramp signal is equal to a product of the input voltage multiplied by the predetermined ratio, and wherein the voltage level of the boost ramp signal is higher than the voltage level of the buck ramp signal.

2. The constant time buck-boost switching converter of claim 1, wherein:
    in a case when the feedback related signal does not exceed the buck ramp signal and also does not exceed the boost ramp signal, the modulation control circuit controls the power switch circuit to operate in a constant ON time buck conversion mode according to a first constant ON time;
    in a case when the feedback related signal exceeds the buck ramp signal and also exceeds the boost ramp signal, the modulation control circuit controls the power switch circuit to operate in a constant ON time boost conversion mode according to a second constant ON time.

3. The constant time buck-boost switching converter of claim 2, wherein:
    when the feedback related signal exceeds the buck ramp signal, the modulation control circuit controls the power switch circuit to enter to a first state and the power switch circuit maintains in the first state for the first constant ON time, and thereafter, when the feedback related signal does not exceed the buck ramp signal, the modulation control circuit controls the power switch circuit to enter to a second state and the power switch circuit maintains in the second state until the feedback related signal once again exceeds the buck ramp signal; or
    when the feedback related signal exceeds the boost ramp signal, the modulation control circuit controls the power switch circuit to enter to a third state and the power switch circuit maintains in the third state for the second constant ON time, and thereafter, the modulation control circuit controls the power switch circuit to enter to the first state and the power switch circuit maintains in the first state until the feedback related signal once again exceeds the boost ramp signal or until the feedback related signal does not exceed the buck ramp signal;
    wherein in the first state, the first terminal of the inductor is electrically connected to the input voltage, and the second terminal of the inductor is electrically connected to the output voltage;
    wherein in the second state, the first terminal of the inductor is electrically connected to the ground, and the second terminal of the inductor is electrically connected to the output voltage;

wherein in the third state, the first terminal of the inductor is electrically connected to the input voltage, and the second terminal of the inductor is electrically connected to the ground.

4. The constant time buck-boost switching converter of claim 3, wherein after the power switch circuit enters to the first state and the power switch circuit maintains in the first state for the first constant ON time, when the feedback related signal exceeds the buck ramp signal, the power switch circuit maintains in the first state until the feedback related signal does not exceed the buck ramp signal or until the feedback related signal exceeds the boost ramp signal.

5. The constant time buck-boost switching converter of claim 4, wherein when the power switch circuit maintains in the first state until the feedback related signal does not exceed the buck ramp signal, the modulation control circuit controls the power switch circuit to enter to the second state and the power switch circuit maintains in the second state for a minimum OFF time.

6. The constant time buck-boost switching converter of claim 4, wherein when the first constant ON time ends, and when the feedback related signal exceeds the buck ramp signal such that the power switch circuit is required to maintain in the first state, a switching frequency of the power switch circuit is decreased as the power switch circuit maintains in the first state, wherein a lower limit of the switching frequency is correlated with at least one of the following parameters: a slope of the buck ramp signal, a peak-to-peak value of the buck ramp signal, a slope of the boost ramp signal and/or a peak-to-peak value of the boost ramp signal.

7. The constant time buck-boost switching converter of claim 6, wherein the feedback related signal is compared with a difference of the buck ramp signal minus an offset, or wherein the feedback related signal is compared with a sum of the boost ramp signal plus the offset.

8. The constant time buck-boost switching converter of claim 7, wherein when the first constant ON time ends, and when the feedback related signal exceeds the buck ramp signal such that the power switch circuit is required to maintain in the first state, the switching frequency of the power switch circuit is decreased as the power switch circuit maintains in the first state, wherein the lower limit of the switching frequency is correlated with the offset corresponding to the buck ramp signal or the offset corresponding to the boost ramp signal.

9. The constant time buck-boost switching converter of claim 7, wherein the offset corresponding to the buck ramp signal is smaller than the peak-to-peak value of the buck ramp signal, or wherein the offset corresponding to the boost ramp signal is smaller than the peak-to-peak value of the boost ramp signal.

10. The constant time buck-boost switching converter of claim 1, wherein the modulation control circuit includes:
a buck switch emulation circuit, which is configured to operably switch an emulation buck switching node between the input voltage and the ground synchronously when the buck switch unit switches the first terminal of the inductor between the input voltage and the ground;
a buck voltage-divider circuit, which is configured to operably divide a voltage at the emulation buck switching node according to a predetermined ratio, so as to generate a buck divided voltage;
a buck integration circuit including a buck integration capacitor, which is configured to be operably charged or discharged according to the buck divided voltage which varies according to a switching of the buck switch emulation circuit, so as to generate the buck ramp signal;
a boost switch emulation circuit, which is configured to operably switch an emulation boost switching node between the output voltage and the ground synchronously when the boost switch unit switches the second terminal of the inductor between the output voltage and the ground;
a boost voltage-divider circuit coupled between the input voltage and the emulation boost switching node, wherein the boost voltage-divider circuit is configured to operably divide a voltage difference between a voltage at the emulation boost switching node and the input voltage according to the predetermined ratio, so as to generate a boost divided voltage; and
a boost integration circuit including a boost integration capacitor, which is configured to be operably charged or discharged according to the boost divided voltage which varies according to a switching of the boost switch emulation circuit, so as to generate the boost ramp signal.

11. The constant time buck-boost switching converter of claim 10, wherein:
the buck switch emulation circuit includes an emulation buck upper gate switch and an emulation buck lower gate switch which are connected in series between the input voltage and the ground, wherein the emulation buck upper gate switch and the emulation buck lower gate switch are coupled to each other at the emulation buck switching node, so that the emulation buck upper gate switch and the emulation buck lower gate switch are configured to operably switch the emulation buck switching node according to a switching of the first terminal of the inductor;
the buck integration circuit further includes: a buck integration resistor, which is coupled in series to the buck integration capacitor and is coupled to the emulation buck switching node, wherein the buck integration resistor is configured to operably determine a charging/discharging current of the buck integration capacitor, so as to generate the buck ramp signal;
the boost switch emulation circuit includes an emulation boost upper gate switch and an emulation boost lower gate switch which are connected in series between the output voltage and the ground, wherein the emulation boost upper gate switch and the emulation boost lower gate switch are coupled to each other at the emulation boost switching node, so that the emulation boost upper gate switch and the emulation boost lower gate switch are configured to operably switch the emulation boost switching node according to a switching of the second terminal of the inductor; and
the boost integration circuit further includes: a boost integration resistor, which is coupled in series to the boost integration capacitor and is coupled to the emulation boost switching node, wherein the boost integration resistor is configured to operably determine a charging/discharging current of the boost integration capacitor, so as to generate the boost ramp signal.

12. A control method, which is configured to operably control a constant time buck-boost switching converter; the control method comprising:
switching a first terminal of an inductor between an input voltage and a ground and switching a second terminal of the inductor between an output voltage and the ground, so as to convert the input voltage to the output voltage;

generating a buck ramp signal and a boost ramp signal according to the input voltage and the output voltage; and controlling the switching operations of the first terminal and the second terminal of the inductor according to a comparison result between a feedback related signal related to the output voltage and the buck ramp signal and according to a comparison result between the feedback related signal and the boost ramp signal, so as to convert the input voltage to the output voltage;

wherein an average voltage level of the buck ramp signal is equal to a product of the output voltage multiplied by a predetermined ratio, wherein an upper limit of a voltage level of the buck ramp signal is equal to a product of the input voltage multiplied by the predetermined ratio, wherein an average voltage level of the boost ramp signal is equal to a product of the output voltage multiplied by the predetermined ratio, wherein a lower limit of a voltage level of the boost ramp signal is equal to a product of the input voltage multiplied by the predetermined ratio, wherein the voltage level of the boost ramp signal is higher than the voltage level of the buck ramp signal.

13. The control method of claim 12, wherein the step of controlling the switching operations of the first terminal and the second terminal of the inductor includes:

in a case when the feedback related signal does not exceed the buck ramp signal and also does not exceed the boost ramp signal, the modulation control circuit controls the power switch circuit to operate in a constant ON time buck conversion mode according to a first constant ON time; or in a case when the feedback related signal exceeds the buck ramp signal and also exceeds the boost ramp signal, the modulation control circuit controls the power switch circuit to operate in a constant ON time boost conversion mode according to a second constant ON time.

14. The control method of claim 13, wherein:

when the feedback related signal exceeds the buck ramp signal, the modulation control circuit controls the power switch circuit to enter to a first state and the power switch circuit maintains in the first state for the first constant ON time, and thereafter, when the feedback related signal does not exceed the buck ramp signal, the modulation control circuit controls the power switch circuit to enter to a second state and the power switch circuit maintains in the second state until the feedback related signal once again exceeds the buck ramp signal; or when the feedback related signal exceeds the boost ramp signal, the modulation control circuit controls the power switch circuit to enter to a third state and the power switch circuit maintains in the third state for the second constant ON time, and thereafter, the modulation control circuit controls the power switch circuit to enter to the first state and the power switch circuit maintains in the first state until the feedback related signal once again exceeds the boost ramp signal or until the feedback related signal does not exceed the buck ramp signal;

wherein in the first state, the first terminal of the inductor is electrically connected to the input voltage, and the second terminal of the inductor is electrically connected to the output voltage;

wherein in the second state, the first terminal of the inductor is electrically connected to the ground, and the second terminal of the inductor is electrically connected to the output voltage;

wherein in the third state, the first terminal of the inductor is electrically connected to the input voltage, and the second terminal of the inductor is electrically connected to the ground.

15. The control method of claim 14, wherein the step of controlling the switching operations of the first terminal and the second terminal of the inductor further includes:

after the power switch circuit enters to the first state and the power switch circuit maintains in the first state for the first constant ON time, when the feedback related signal exceeds the buck ramp signal, the power switch circuit maintains in the first state until the feedback related signal does not exceed the buck ramp signal or until the feedback related signal exceeds the boost ramp signal.

16. The control method of claim 15, wherein the step of controlling the switching operations of the first terminal and the second terminal of the inductor further includes:

after the power switch circuit maintains in the first state until the feedback related signal does not exceed the buck ramp signal, controlling the power switch circuit to enter to the second state and the power switch circuit maintains in the second state for a minimum OFF time.

17. The control method of claim 15, wherein the step of controlling the switching operations of the first terminal and the second terminal of the inductor further includes:

when the first constant ON time ends, and when the feedback related signal exceeds the buck ramp signal such that the power switch circuit is required to maintain in the first state, a switching frequency of the power switch circuit is decreased as the power switch circuit maintains in the first state, wherein a lower limit of the switching frequency is correlated with at least one of the following parameters: a slope of the buck ramp signal, a peak-to-peak value of the buck ramp signal, a slope of the boost ramp signal and/or a peak-to-peak value of the boost ramp signal.

18. The control method of claim 17, wherein the step of controlling the switching operations of the first terminal and the second terminal of the inductor according to a comparison result between a feedback related signal related to the output voltage and the buck ramp signal and according to a comparison result between the feedback related signal and the boost ramp signal includes:

comparing the feedback related signal with a difference of the buck ramp signal minus an offset, or comparing the feedback related signal with a sum of the boost ramp signal plus the offset.

19. The control method of claim 18, wherein when the first constant ON time ends, and when the feedback related signal exceeds the buck ramp signal such that the power switch circuit is required to maintain in the first state, a switching frequency of the power switch circuit is decreased as the power switch circuit maintains in the first state, wherein a lower limit of the switching frequency is correlated with the offset corresponding to the buck ramp signal or the offset corresponding to the boost ramp signal.

20. The control method of claim 18, wherein the offset corresponding to the buck ramp signal is smaller than the peak-to-peak value of the buck ramp signal, or wherein the offset corresponding to the boost ramp signal is smaller than the peak-to-peak value of the boost ramp signal.

21. The control method of claim 12, wherein the step of generating the buck ramp signal and the boost ramp signal includes:
- switching an emulation buck switching node between the input voltage and the ground synchronously with the switching of the first terminal of the inductor between the input voltage and the ground;
- dividing a voltage at the emulation buck switching node according to a predetermined ratio, so as to generate a buck divided voltage;
- executing integration on the buck divided voltage according to the switching of the first terminal of the inductor, so as to generate the buck ramp signal;
- switching an emulation boost switching node between the output voltage and the ground synchronously with the switching of the second terminal of the inductor between the output voltage and the ground;
- dividing a voltage difference between a voltage at the emulation boost switching node and the input voltage according to the predetermined ratio, so as to generate a boost divided voltage;
- executing integration on the boost divided voltage to the switching of the second terminal of the inductor, so as to generate the boost ramp signal.

* * * * *